(12) United States Patent
Mourlam et al.

(10) Patent No.: US 12,360,538 B1
(45) Date of Patent: Jul. 15, 2025

(54) OPERATIONS OF ARTICULATING BOOM ASSEMBLIES

(71) Applicant: Altec Industries, Inc., Birmingham, AL (US)

(72) Inventors: Timothy J. Mourlam, Shawnee, KS (US); Michael A. Fleming, Kansas City, MO (US); JD Casias, St. Joseph, MO (US); Aaron B. Beck, Kansas City, MO (US); Jonathan Westin Sykes, Gower, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/914,750

(22) Filed: Oct. 14, 2024

(51) Int. Cl.
*G05D 1/229* (2024.01)
*G05D 1/224* (2024.01)
*G05D 1/46* (2024.01)
G05D 105/05 (2024.01)
G05D 109/10 (2024.01)

(52) U.S. Cl.
CPC ........... *G05D 1/229* (2024.01); *G05D 1/2247* (2024.01); *G05D 1/46* (2024.01); G05D 2105/05 (2024.01); G05D 2109/16 (2024.01)

(58) Field of Classification Search
None
See application file for complete search history.

(56) References Cited

U.S. PATENT DOCUMENTS

| | | | |
|---|---|---|---|
| 11,697,209 B1 | 7/2023 | Mourlam et al. | |
| 2014/0110168 A1* | 4/2014 | Pursimo | E21B 7/025 701/50 |
| 2020/0039805 A1* | 2/2020 | Li | B66F 11/046 |
| 2020/0207600 A1* | 7/2020 | Bonnefoy | G01S 13/931 |
| 2021/0010236 A1* | 1/2021 | Nishi | E02F 9/2292 |

* cited by examiner

*Primary Examiner* — Tamara L Weber
(74) *Attorney, Agent, or Firm* — Erise IP, P.A.

(57) ABSTRACT

Systems, methods, and computer-readable media for improved control of articulating boom assemblies are disclosed herein. Automated functions, such as auto ground and auto stow functions, may be provided to automatically move an articulating boom assembly to the desired position. When an automated function is requested, a series of waypoints may be generated, and the boom assembly may move a boom tip thereof through each of the series of waypoints. Using the machine geometry of the boom assembly and the pose of the boom assembly when the automated function is requested may enable the waypoints to be determined. The automated functions may enable the boom assembly to be moved faster than when manually operated and also eliminates the need for the operator to provide a series of complex inputs required to move each joint of the articulating boom assembly to reach the desired position.

21 Claims, 15 Drawing Sheets

OPERATIONS OF ARTICULATING BOOM ASSEMBLIES

BACKGROUND

1. Field

Embodiments of the present disclosure relate to articulating boom assemblies. More specifically, embodiments of the present disclosure relate to automatically moving articulating boom assemblies to a desired position.

2. Related Art

Boom assemblies are typically used to raise an operator to a remote location. The boom assemblies often include an aerial platform attached to a boom tip that is located at an upper end of an upper (or distalmost) boom of the boom assembly. Operators enter the aerial platform while the boom assembly is in a stowed position where the platform is accessible via a truck bed of a utility truck on which the boom assembly is supported (see, e.g., FIG. 2A).

The aerial platforms are generally provided as a rectangular enclosure without a door and with an open top such that the operator must climb over the walls of the platform for ingress and egress. The walls of the platform are relatively tall (e.g., about three feet in height) such that climbing into and out of the platform presents safety hazards as the operator is prone to slipping, tripping, and/or falling when entering and exiting the platform. Typically, the stowed position of aerial platform on utility truck is above the truck deck of the utility truck such that ingress/egress into/from the aerial platform is done at a height of about six or more feet and that slips while entering/exiting the aerial platform pose the risk of a fall to the ground from this height. These safety hazards are exacerbated as operators may often work in wet conditions where a slippage risk is present. Furthermore, operators may need to carry supplies into and out of the aerial platform, which may further increase the difficulty and associated risk with platform ingress and egress. Further still, in the event that an operator in the platform is injured while working, removing the injured operator becomes difficult due to the platform structure.

Controlling the movement of the boom assembly requires the operator to provide a complex series of inputs to move each boom section in the boom assembly. Thus, for example, to return the boom assembly from a working position in the air to the stowed position where the boom assembly is ready for transport, the boom operator must articulate both the upper boom and the lower boom to fold the upper boom on top of the lower boom. Inputs to rotate a turntable supporting the boom assembly may also be required. Due to the complexity of the inputs, moving the boom assembly can be time consuming. Automating such movements would therefore be an improvement to existing articulating boom assemblies. Further, it would be desirable to simplify manual inputs to be more intuitive for the operator.

Standards governing boom assemblies (e.g., ANSI standards) require boom assemblies to include lower controls that are located at the base of the boom assembly, which are in addition to the upper controls located in the aerial platform. These lower controls are required such that operators at the base of the boom assembly can operate the boom assembly in the event of an operator in the aerial platform being unable to operate the upper controls. However, these lower controls are often not used by operators. Further, the lower controls typically require two hands to operate. It would be desirable to enable single-handed operation of the lower controls to free up the operator's other hand. For example, it would be desirable for the operator to be able to raise the boom to a ground position with a single hand such that the other hand is available to perform other functions, such as calling emergency services in the event of an injury to the operator in the aerial platform.

SUMMARY

Embodiments of the present disclosure are generally directed to systems, methods, and computer-readable media for automatic control of articulating boom assemblies. An articulating boom assembly may comprise an upper boom section supporting a boom tip, a lower boom section coupled to the upper boom section, and a turntable coupled to the lower boom section. When a request for an automated motion of the boom assembly is received, the current pose of the boom assembly may be determined. Based on this pose, a number of waypoints may be determined through which the boom tip is guided to reach a target position. The boom assembly may be articulated to move the boom tip through each of the waypoints. The movement may be done such that the boom tip moves in a straight line and may also be done such that the boom tip moves at constant velocity.

Alternatively to determining coordinate waypoints, the automated motion may be enabled by providing target joint angles for joints of the articulating boom assembly. The joints may then be articulated to meet the target joint angles, placing the boom tip at the target position. The target positions may be a ground position, a stow position, or any user-defined position.

Embodiments are also directed to input devices for requesting automated movements and other movements of articulating boom assemblies. An input device may include non-metering or momentary inputs that require an operator to maintain the input to cause a corresponding movement in the boom assembly. Movement of the boom assembly in response to the input may continue as long as the input is maintained.

In some embodiments, the techniques described herein relate to a method for automatically moving an articulating boom assembly, the articulating boom assembly including an upper boom coupled to a lower boom at a first end and coupled to a boom tip at a second end, including: receiving, via a computing device associated with the articulating boom assembly, user input indicative of an end position for the boom tip; determining, based on the user input, a first coordinate location of the end position; generating a flight path from a second coordinate location of a starting position of the boom tip to the end position, wherein the flight path includes a plurality of coordinate waypoints between the first coordinate location and the second coordinate location; automatically moving the articulating boom assembly to move the boom tip through each of the plurality of coordinate waypoints to the end position; and responsive to reaching one of the end position or a predefined distance to the end position, stopping motion of the articulating boom assembly.

In some embodiments, the techniques described herein relate to a system for automatically moving a boom assembly, including: a boom assembly base supporting the boom assembly, the boom assembly including at least one boom section; at least one boom component, wherein the at least one boom component includes at least one of a boom tip, a jib tip, or a joint of the boom assembly; at least one processor; and one or more non-transitory computer-readable media storing computer-executable instructions that, when executed by the at least one processor, cause the system to carry out actions, including: receiving user input indicative of an end position of the at least one boom component; generating a flight path from a start position of the at least one boom component to the end position; wherein the flight path includes a plurality of waypoints between the start position and the end position, and automatically moving the boom assembly through the flight path; and when the at least one boom component reaches the end position, stopping movement of the boom assembly.

In some embodiments, the techniques described herein relate to one or more non-transitory computer-readable media storing computer-executable instructions that, when executed by at least one processor, perform a method of automatically moving a boom assembly, including: receiving user input indicative of an end position for a boom tip of the boom assembly, wherein the boom assembly includes a lower boom coupled to an upper boom at a first end of the upper boom, and wherein the boom tip is coupled to a second end of the upper boom; responsive to receiving the user input, determining a flight path for the boom tip from a start position of the boom tip to the end position, wherein the flight path includes a plurality of waypoints between the start position and the end position; automatically moving the boom assembly to thereby move the boom tip through each of the plurality of waypoints and to the end position; and when the boom tip reaches the end position, stopping further movement of the boom assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
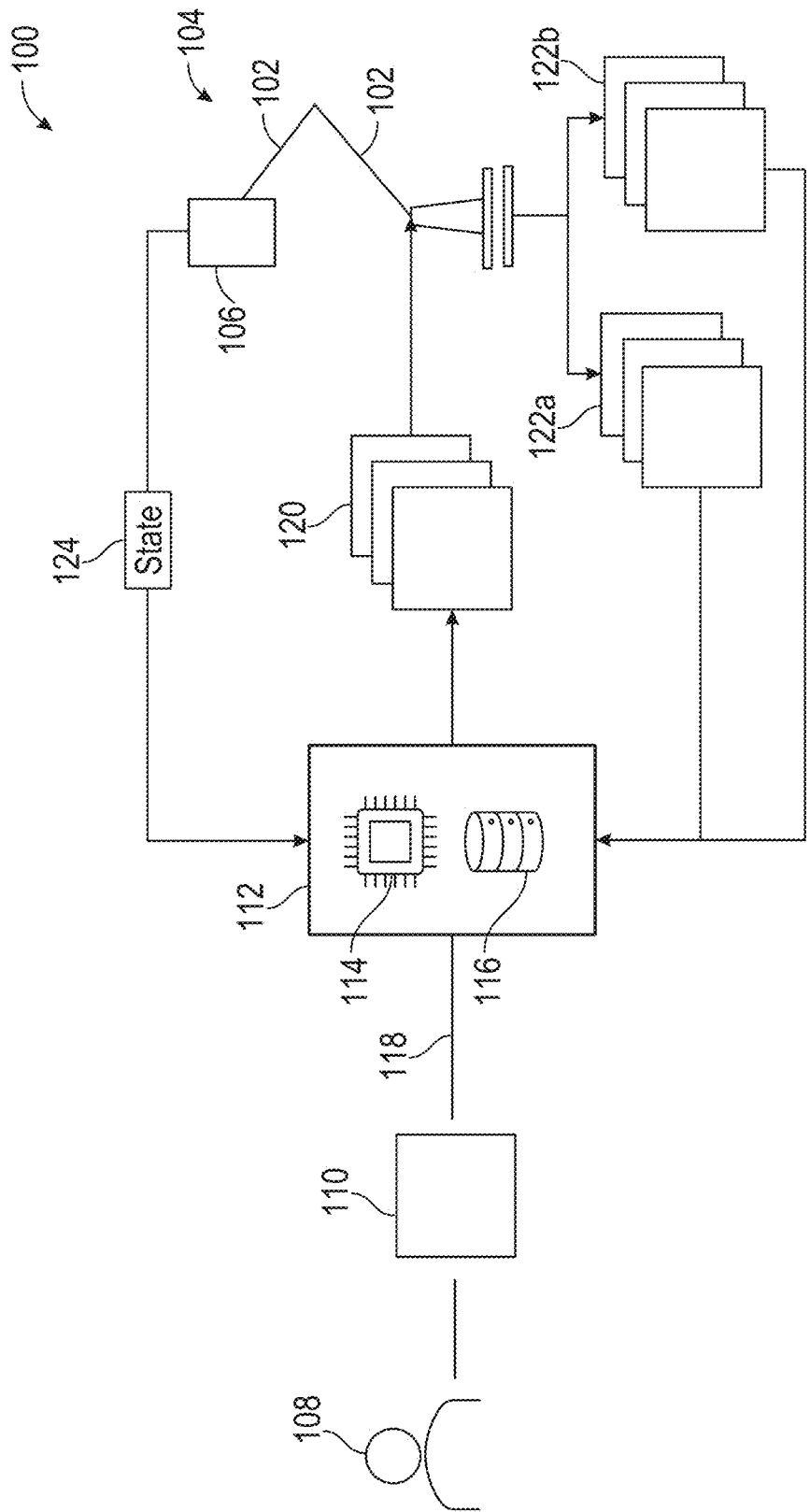
FIG. 1 illustrates an exemplary block diagram for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

System Overview

Generally, embodiments discussed herein are directed to automated operations of an articulating boom assembly. The articulating boom assembly may be supported by a boom supporting structure or base, such as a utility truck, and the assembly may include a turntable for rotating the boom assembly, a lower boom, an upper boom, a boom tip, and an aerial platform. The lower boom may be coupled at a first, lower end to the turntable and at a second, upper end to the upper boom. The upper boom may be coupled at a first, lower end to the lower boom and at a second, upper end to the boom tip. The aerial platform may be coupled to the boom tip and may include a structure in which an operator can perform work operations in the air while supported by the boom assembly. In some embodiments, a first input device for controlling the movement of the boom assembly is provided and located proximate the boom assembly base. In some embodiments, a second input device, provided for controlling the movement of the boom assembly, is located in the aerial platform. Thus, the movement of the articulating boom assembly may be controlled by both an operator in the aerial platform and an operator at the boom assembly base.

Other boom assembly configurations, such as telescoping, articulating telescopic, and elevator are within the scope hereof.

In some embodiments, the input device comprises one or more inputs that, when actuated, cause the boom assembly to carry out associated automated movements. In some embodiments, the inputs are non-metering or momentary inputs such that the automated movement only proceeds while the input is held by the operator. A first input may be provided that, when actuated, causes the boom assembly to automatically move to a ground position in which the platform is placed on or proximate a ground surface. A second input may be provided that, when actuated, causes the boom assembly to automatically move to a stowed position in which the boom assembly is thereafter ready for transport. Other automated movements are within the scope hereof, and the inputs/end positions may be programmable by the operator. For example, the operator may program an input to cause the boom assembly to return to a last working location when the programmed input is actuated, which may be useful when the operator is working in the same location on consecutive workdays or after taking a break. The operator may provide two or more inputs simultaneously, such as an input to move the boom assembly to a ground position, while the operator also controls the movement of the upper boom, for example, and the boom assembly may process both inputs in parallel such that the automated ground movements of the boom assembly occur simultaneously to the manual adjustments of the upper boom.

FIG. 1 illustrates a block diagram of a system 100 in accordance with embodiments of the present disclosure for controlling the speed of one or more articulators 102 of a boom assembly 104 in accordance with aspects of the present disclosure. In some embodiments, the articulators 102 correspond to boom sections of the boom assembly 104, such as a lower boom section or an upper boom section, as depicted with respect to FIGS. 2A-2C and 5A-5D. The articulators 102 may generally correspond to any actuatable component of a boom assembly 104, such as a turntable, a boom tip 106, or an aerial platform, each of which are discussed further hereinafter. In some embodiments, articulator 102 may be moved with constant jerk. Operating boom assembly 104 with constant jerk may be advantageous to provide a smooth operation for operators in the aerial platform. By operating with constant jerk, the acceleration is linear, which mitigates sudden stops and starts of the aerial platform.

An operator 108 may utilize an input device 110 to provide input to a computer or control system 112 to control operations of boom assembly 104. In some embodiments, the input device 110 is a keypad device (see FIG. 7), a pendant device, a radio remote control (which may comprise an array of joysticks, buttons, or other input means), a lower control station of the boom assembly or any other device that may be configured to accept input from a user. The input device 110 may be hardwired to the boom assembly 104 or to a base (e.g., a utility truck) supporting the boom assembly. In some embodiments, the input device 110 is a computing device, such as a tablet computer. One or more input devices 110 may be provided.

Figure 7:
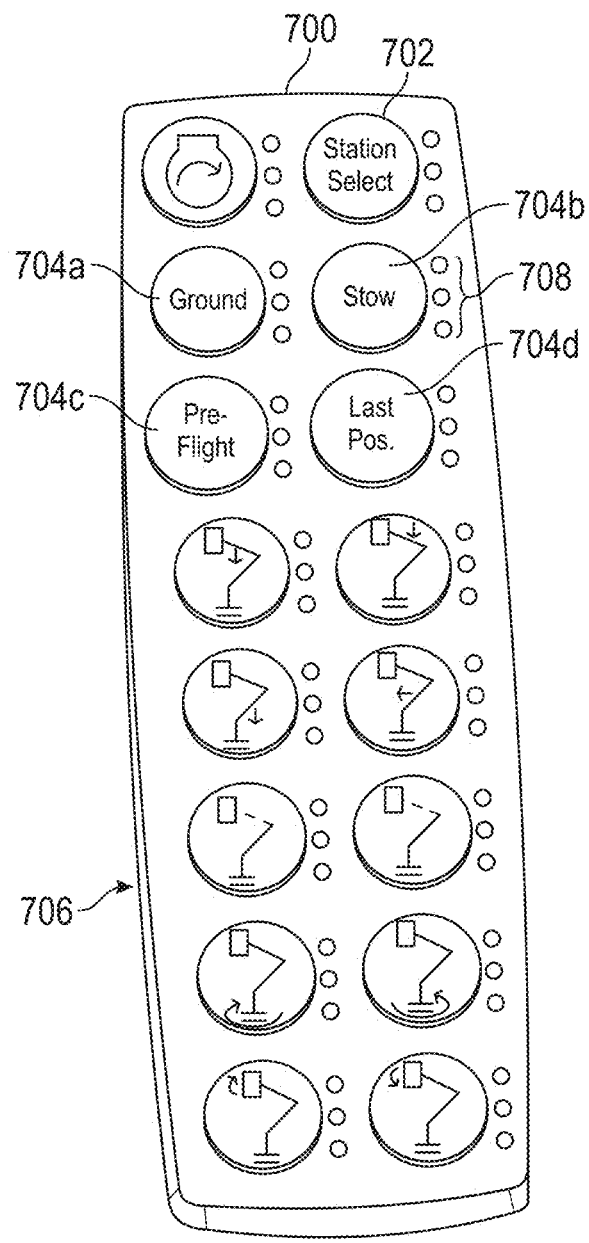
FIG. 7 illustrates a keypad control device for controlling the movements of an aerial device for some embodiments.

As discussed in further detail with respect to FIG. 7, the input device 110 may comprise a plurality of inputs, such as buttons, that the operator 108 may actuate to control the movement in the boom assembly 104. The inputs may, for example, include inputs to individually move each articulator 102 of the boom assembly 104, such as to rotate the upper boom, or to slew (rotate) the turntable. Additionally, the inputs may be actuated to cause an automated motion of the boom assembly 104 in which the articulating articulators 102 (e.g., upper and lower boom sections) are articulated to place boom tip 106 at a desired end position that corresponds to the indicated automated input. As used herein, an automated input may refer to a user input that causes an automated motion to occur. For example, where the automated input is an auto-ground input, the desired end position of the boom tip 106 is a ground position, and control system 112 may be configured to compute and control the articulation of each articulator 102 to place the boom tip on the ground. As discussed further below, determining the articulation of boom assembly 104 may involve computing a plurality of XYZ coordinate waypoints that boom tip 106 is guided through and determining the required articulation of boom assembly 104 to move boom tip 106 to each of the XYZ coordinate waypoints.

Embodiments herein are generally described with respect to boom assemblies that perform automated motions to place a boom tip at a desired end position. However, it will be appreciated that aspects of the present disclosure are not limited to moving only boom tips to a desired position and that generally any component of the boom assembly may be guided to the desired end position. For example, instead of the boom tip, an end effector, such as a jib tip, a joint of the boom assembly, or the like may be the component that is placed at the end position. As discussed further herein, the automated movement to place the boom tip (or another boom component) in a desired end position is based at least in part on the known geometry and pose of the various components of the boom assembly such that the techniques described with respect to placing the boom tip at the end position are generally applicable to other components of the boom assembly. In some embodiments, the boom component that is moved to the desired end position via automated motion of the whole boom assembly is user-selectable, such as via input device 110 or via a user interface, which in some embodiments, may be included with or in association with input device 110.

The control system 112 may include one or more processors 114 configured to execute computer-executable instructions that, when executed, cause the systems described herein (e.g., the aerial devices and/or boom assemblies) to carry out one or more actions. In some embodiments, the one or more actions are based on input received via an input device 110, such as the actions of the boom assemblies described herein. Control system 112 may further comprise memory 116, which may be any form of non-transitory computer-readable memory and may store the computer-executable instructions executed by processors 114. As discussed in further detail below, control system 112 may be configured to compute a flight path and/or target joint angles of a boom assembly that will place boom tip 106 in a desired end position. An exemplary control system 112 is discussed further below with respect to FIG. 9.

In some embodiments, memory 116 stores information of the boom assembly 104. For example, memory 116 may store information of each articulator 102 of the boom assembly, such as geometrical information of each articulator 102 and of mechanical limits of each articulator 102. Accordingly, when determining how to move boom assembly 104 to place boom tip 106 at a desired end position, control system 112 may use the geometrical information and the mechanical limits to determine the potential positions that each articulator 102 can be moved to.

In some embodiments, control system 112 is located on boom assembly 104 or on a utility truck or other boom assembly base that supports boom assembly 104. In some embodiments, control system 112 and input device 110 are the same device, such as when input device 110 is configured as a tablet computer. In some embodiments, input device 110 is communicatively coupled to control system 112 via a communications link 118. The communications link 118 may be a wired link, such as a fiber optic link. In some embodiments, input device 110 is located on the utility vehicle and is wired to control system 112 such that the input device 110 can only be used by the operator 108 while operator 108 is on the utility vehicle and not on the ground. The utility vehicles are typically electrically isolated such that the operator 108 is electrically isolated while on the vehicle and, consequently, when using input device 110 to prevent an electrical short to ground that may occur if the operator 108 were to use the input device 110 while grounded. In some embodiments, the communications link 118 is a wireless link, such as a BLUETOOTH connection. Generally, any type of communications link 118 may be employed.

Control system 112 may be configured to receive inputs from operator 108 via input device 110 and to control operations of one or more articulators 102 on boom assembly 104 based on the received inputs. In some embodiments, boom assembly 104 may be hydraulically actuated, and hydraulic valves 120 are employed to control the flow of hydraulic fluid to power a corresponding articulator 102. Thus, control system 112 controlling the operations of articulator 102 based on the received inputs may comprise controlling the operations of the valves 120 powering the articulator 102.

Boom assembly 104 may further comprise boom assembly sensors 122a that may provide sensor data associated with boom assembly 104. In some embodiments, sensors 122a include sensors configured to provide pose (position and orientation information) for one or more articulators 102. The pose information may be used in determining how to articulate the articulator 102 to place boom tip 106 in the desired end position. For example, sensors 122a may include accelerometers, gyroscopes, inertial measurement units, load cells, inclinometers, rotary encoders for measuring a position of an articulator 102, and the like. Generally, any sensor 122a for measuring one or more parameters associated with the operation (e.g., position, orientation, load, etc.) of articulator 102 is within the scope hereof. The sensors 122a may be located at various locations along the boom assembly 104. For example, each articulator 102 may have one or more sensors 122a that monitor the position and/or orientation thereof, which may be communicated to control system 112 such that control system 112 can monitor the pose of each articulator 102 in real time.

Boom assembly 104 may also include environmental sensors 122b that may be configured to detect information about the environment in which boom assembly 104 is operating. For example, environmental sensors 122b may include a video camera configured to capture video at the boom tip, which may be transmitted to the operator 108 and displayed on a display device, such as shown in FIG. 2D. In some embodiments, the video camera is a three-dimensional depth camera. In some embodiments, environmental sensors 122b includes a plurality of cameras including at least one three-dimensional depth camera and at least one other video camera that captures two-dimensional imagery.

Environmental sensors 122b may also include one or more object detection sensors, which may include any combination of cameras (e.g., depth cameras and 2D cameras), infrared sensors, ultrasonic sensors, LIDAR sensors, RADAR sensors, magnetic sensors, acoustics sensors, proximity sensors, laser sensors, touch sensors, electric voltage detectors, and the like. Object detection sensors 122b may be configured to sense an object in the environment and/or otherwise capture data that can be processed by control system 112 to detect an object in the environment. In response to detecting an object in the environment, control system 112 may be configured to adjust the operations of boom assembly 104. For example, if it is determined the detected object is in the path of the boom tip 106, control system 112 may compute a new XYZ waypoint that avoids the detected object. In some embodiments, a proximity sensor is provided on the boom tip or the aerial platform to detect the proximity of the boom tip or the aerial platform to ground. In some embodiments, control system 112 prevents further automatic movement of the boom assembly 104 responsive to detecting an object such that the operator 108 must manually move boom assembly 104 around the object. In some embodiments, control system 112 recomputes the flight path to avoid the object as discussed further below.

Sensors 122b may likewise be disposed on any portion of boom assembly 104 and/or may be proximate to boom assembly 104 (e.g., at the utility vehicle). In some embodiments, the sensors 122b are located at or proximate boom tip 106 to collect data that is proximate the boom tip 106, which may be useful in providing a remote operator a real-time understanding of the conditions at the boom tip 106 (e.g., via video information). Furthermore, it is contemplated that sensors 122b may be remote from the boom assembly 104. For example, object detection sensors 122b could be located on another machine, such as a drone, that operates in proximity to the boom assembly 104. In this example, the drone may be controlled by an operator or operate automatically to monitor the surroundings of boom assembly 104 and may include one or more sensors 122b configured to detect objects proximate the boom assembly 104.

Sensor data from boom assembly sensors 122a and/or environmental sensors 122b may be communicated to control system 112 via fiber optics across a dielectric gap in some embodiments. In some embodiments, an upper boom of the boom assembly 104 is formed of an electrically insulating material (e.g., fiberglass) to electrically isolate boom tip 106 from the base of the boom assembly 104. Accordingly, communications between the boom tip 106 and the boom assembly base may be done via communication means that can transfer data across a dielectric gap, such as fiber optics. In some embodiments, sensor data from sensors 122a and/or environmental sensors 122b is communicated to input device 110 via another wired connection or via any type of wireless connection. Sensor data may then be displayed to operator 108 via a display, such as via a computing device 248 discussed with respect to FIG. 2D.

Control system 112 may also collect or determine state information 124 relating to a state of the boom assembly 104. The state information 124 may be used to control the operations of boom assembly 104 based on instructions received from the operator 108 via input device 110. In some embodiments, controlling the operations of boom assembly 104 based on state information 124 comprises moving the boom assembly 104 at different velocities and/or accelerations based on the state information 124. For example, the state information 124 may indicate that the boom assembly 104 is in a stowed state (e.g., is in the position illustrated in FIGS. 2A and 5A) or has just been moved out of the stowed state. Based on this state information 124, control system 112 may move boom assembly 104 at a higher velocity in response to input from operator 108 to more quickly move boom assembly 104 to the desired end position. When boom assembly 104 is moving from the stowed state, there may be less of a risk of accidental collisions such that control system 112 can move the boom assembly 104 safely at the higher velocity. As another example, the state information 124 may indicate the boom assembly 104 is above a flight deck (discussed further below), and control system 112 may likewise operate the articulators 102 at greater velocities relative to velocities when the boom assembly 104 is below the flight deck.

In some embodiments, the state information 124 relates to whether the boom assembly 104 is beginning movement or stopping movement, which may be determined based on data from sensors 122a, 122b. In some embodiments, the adjustments to the speed of the boom assembly 104 based on the state information 124 is performed by controlling the valves 120 accordingly to provide more or less speed to the articulators 102. For example, boom assembly 104 may be preprogrammed to operate the valves 120 at a percentage (e.g., 25%) above or below a normal operating speed based on the state information 124. As discussed further below with respect to FIG. 8, control system 112 may employ a motion profile that controls the motion of an articulator 102 as the actuator reaches a boundary, such as the ground, an object, or an articulation limit of the actuator. Alternatively, or additionally, control system 112 may employ a machine learning model may be trained to determine optimal adjustments to the speed of articulator 102 based on the state information 124.

The changes in velocity and/or acceleration of boom assembly 104 based on control system 112 may be performed independently of the operator input. That is, control system 112 may adjust the speed of boom assembly 104 without requiring operator 108 to change the given input and/or to provide a separate input to slow down or speed up boom assembly 104. Thus, to move boom assembly 104 to a desired end position, the operator 108 may only have to hold the corresponding input, while the control system 112 may adjust the velocities of each articulator 102 and determine the positions that control system 112 should be guided through. As the boom assembly 104 begins moving from the start position, the control system 112 may move boom assembly 104 at a first, slower velocity, and as the input is continuously held by the operator 108, the velocity may increase to quickly move the boom assembly 104 to the end position. Then, as the boom tip 106 nears the end position, the one or more processors 114 may slow the movement of boom assembly 104 to prevent an accidental collision if, for example, the end position of boom tip 106 is proximate a boundary.

In some embodiments, the state information 124 is used by control system 112 to disallow operations of boom assembly 104 by boom tip 106. For example, if the state information 124 indicates the boom assembly 104 is moving from a stowed position, control system 112 may prevent the use of an automated movement input until the operator 108 manually moves the boom assembly 104 to a safe operating position, such as above a flight deck (discussed further below). As another example, if an object is detected, control system 112 may similarly disallow input of an automated movement. Alternatively, as described herein, the control system 112 may reconfigure the flight path to avoid the object.

Aerial Devices

Figure 2A:
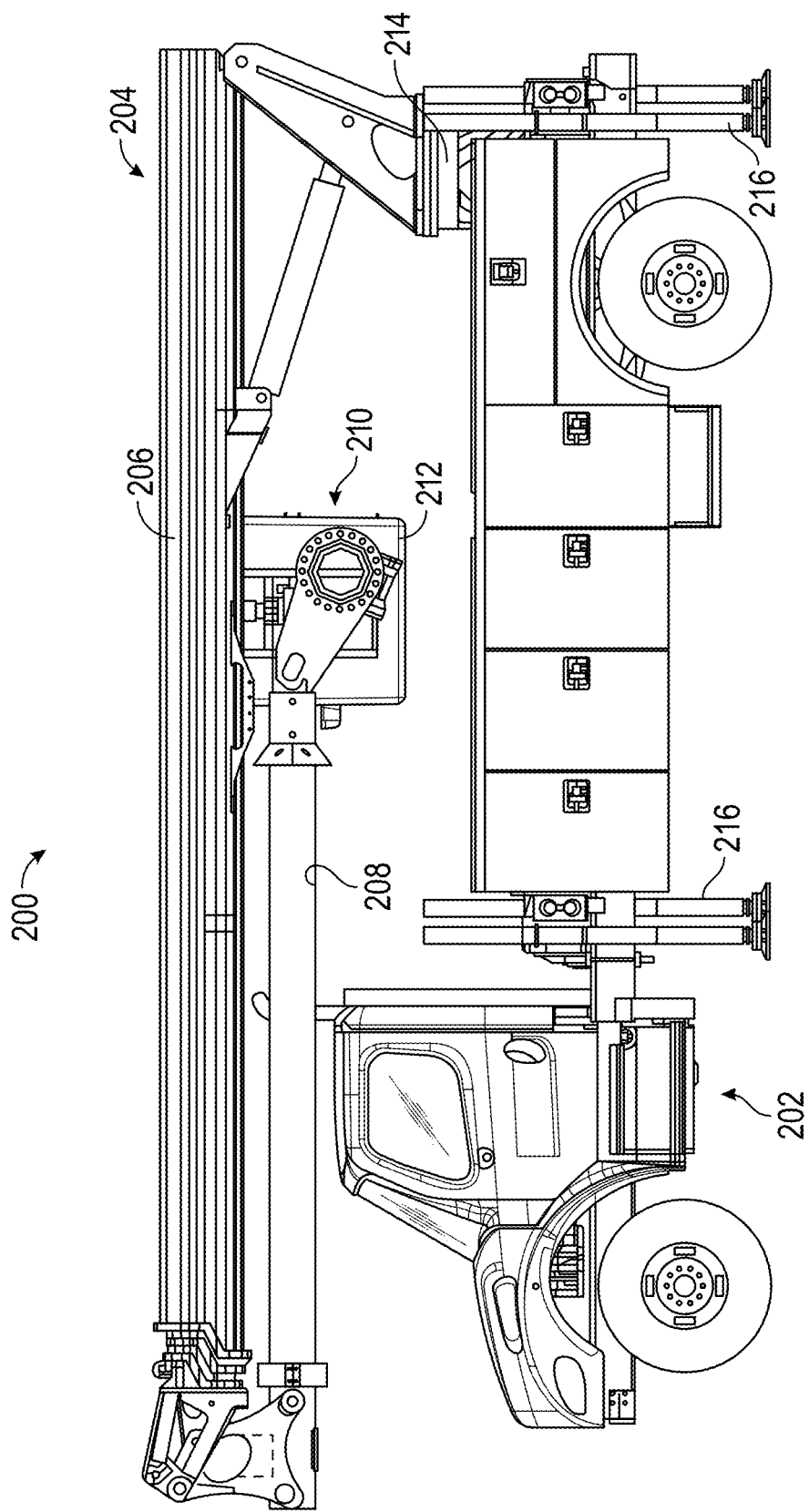
FIG. 2A illustrates a first aerial device in a stowed position for some embodiments.

FIG. 2A illustrates an aerial device 200 in a stowed position in accordance with embodiments of the present disclosure. Aerial device 200 may be attached to and supported by a supporting structure or base, such as a utility vehicle 202 as shown. In some embodiments, aerial device 200 comprises an articulating boom assembly 204. The articulating boom assembly 204 may comprise a lower boom 206, an upper boom 208 (also referred to as a flyboom), a boom tip 210, and an aerial platform 212. The articulating boom assembly 204 may be configured as an underfold boom assembly in which upper boom 208 folds beneath lower boom 206 when articulating boom assembly 204 is in the stowed position as depicted. As another example, the articulating boom assembly 204 may be a side by side boom configuration, which may be either an underfold or an overfold. Generally, any configuration of articulating boom assembly 204 is within the scope hereof. In some embodiments, either or both of lower boom 206 and upper boom 208 may include a telescoping portion for telescopically extending and retracting the length of articulating boom assembly 204. In some embodiments, lower boom 206 is a four-stage telescoping boom. Generally, lower boom 206 may comprise any number of stages.

Boom tip 210 may be coupled to aerial platform 212, which may have a jib thereon (not shown). Aerial platform 212 may be a bucket, for example, in which a lineman may be positioned to operate on an energized line. In some embodiments, boom tip 210 supports a robotic assembly that may be remotely controlled by an operator working remotely from the energized powerline.

Aerial device 200 may further comprise a turntable 214 located on utility vehicle 202. Turntable 214 may be coupled to a proximal or lower end of lower boom 206 and may pivotally move articulating boom assembly 204. Turntable 214 may rotate between 0 and 360 degrees to cause corresponding rotation of articulating boom assembly 204.

Aerial device 200 may be used for performing work on or near high-voltage power lines. As such, aerial device 200 may be operated near electrically powered high-voltage cables. In some embodiments, aerial platform 212 and articulating boom assembly 204 comprise insulating material for electrically insulating aerial device 200. Further, any electrical components disposed in the aerial platform 212 and/or articulating boom assembly 204 may be self-contained and separate from the electrical components of utility vehicle 202. Accordingly, a dielectric gap is created between components at the distal end of upper boom 208 (i.e., boom tip 210 and aerial platform 212) and utility vehicle 202. In some embodiments, lower boom 206 is non-insulating and may be formed from steel, for example, and upper boom 208 is insulating and may be formed from fiberglass, for example. As another example, lower boom 206 may include a section of fiberglass structure that is inserted in the lower boom to function as a chassis insulating section. In some such embodiments, the section of fiberglass may be small relative to the steel section and, for example, may have a length of about 5%, 10%, 20%, 30%, 40%, or 50% of a length of the steel section. The fiberglass section may be proximate the chassis or base of the boom assembly 204. Communications between utility vehicle 202 and aerial platform 212 may be carried out via fiber optics and/or wireless communications. In some embodiments, utility vehicle 202 may generally be referred to as a base, and may be any of a vehicle, a crane, a platform, a truck bed, a mechanical tree trimming apparatus, or any other base capable of supporting aerial device 200. Utility vehicle 202 may additionally comprise one or more outriggers 216 for stabilizing utility vehicle 202.

Aerial device 200 may have a maximum working height of about 205 feet. Boom tip 210 may be configured to support a weight of about 1500 pounds. Aerial device 200 may have a side reach off of the sides and rear of utility vehicle 202 of about 56 feet. Aerial device 200 may have a side reach off the front of utility vehicle 202 of about 47 feet. It will be appreciated that the dimensions provided above are exemplary, and that other dimensions may be employed without departing from the scope of the present disclosure.

Figure 2B:
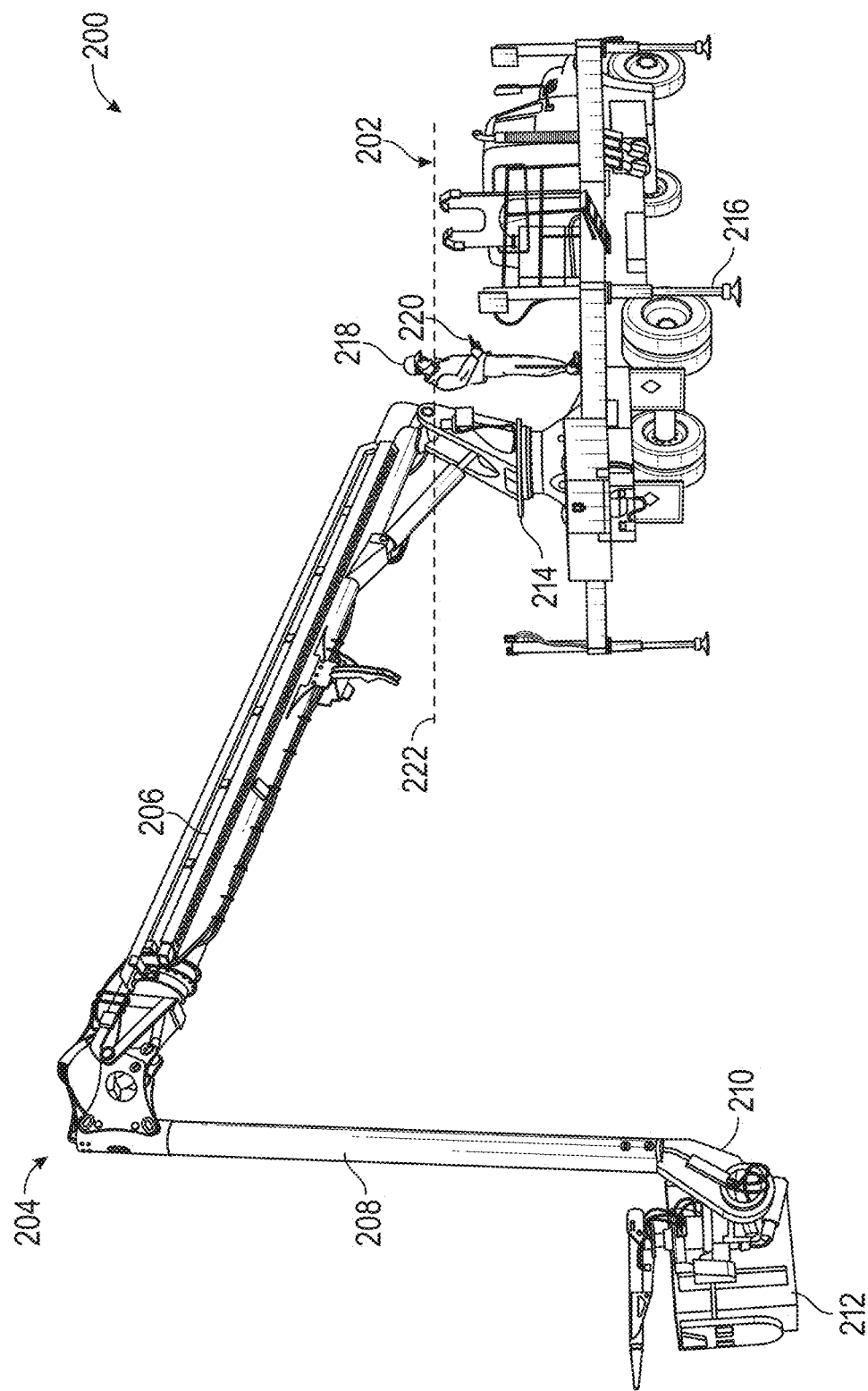
FIG. 2B illustrates the first aerial device in a ground position for some embodiments.

Looking also at FIG. 2B, it can be seen that an operator 218 may operate the articulating boom assembly 204 using an input device 220 located on or proximate the utility vehicle 202. An additional input device 220 may be provided at the aerial platform 212 such that an operator 218 can control articulating boom assembly 204 from the aerial platform 212. An input device 220 located in the aerial platform 212 may be referred to as an upper input device or upper control, while an input device 220 located at utility vehicle 202 may be referred to as a lower or ground control device. The input device 220 may be configured as a keypad input device and may comprise a plurality of inputs (see FIG. 7) actuatable by operator 218 to cause a corresponding movement of the articulating boom assembly 204. In some embodiments, the input device 220 includes one or more inputs configured to cause an automated motion of the boom assembly 204, such as moving the articulating boom assembly 204 from a working position in the air to the stowed position illustrated in FIG. 2A.

In some embodiments, a flight deck 222 is associated with aerial device 200. The flight deck 222 may be a plane above which at least a portion of boom assembly 204 must be before certain operations of the boom assembly 204 are allowed to proceed. For example, when performing an automated operation from a stow position, lower boom 206, upper boom 208, boom tip 210, or any combination thereof must first be moved above the flight deck 222 before moving through the waypoints (discussed further below) to move to the final end position. The position of the flight deck 222 may be associated with safe operating conditions of boom assembly 204. For example, the flight deck 222 may be a height from the bed of the utility vehicle 202 above which collisions with an operator 218 and utility vehicle 202 can be avoided. In some embodiments, the flight deck 222 distance is relative to ground or to an origin position of the boom assembly 204 (e.g., the stowed position). While illustrated as planar, it will be appreciated that flight deck 222 may be non-planar and may generally be any spatial boundary around utility vehicle 202. For example, the flight deck 222 may also define a lateral distance off the sides of utility vehicle 202 that boom assembly 204 must exceed to prevent collisions with utility vehicle 202. In some embodiments, when an automated operation is requested, boom assembly 204 is first moved above the flight deck 222 before any additional calculations are performed to determine the motion of the boom assembly 204 to reach the desired end position. In some embodiments, the flight deck 222 is configurable by the operator 218.

FIG. 2B further depicts aerial device 200 in a ground position, where aerial platform 212 is on or proximate the ground. In some embodiments, by proximate the ground it is meant that aerial platform 212 is at a height above the ground that enables the operator to climb into and out of the aerial platform 212. As previously discussed, moving from the stowed position shown in FIG. 2A (or any other start position) to an end position, such as the ground position, typically requires the operator to input a number of complex inputs to move each boom 206, 208. Embodiments of the present disclosure provide improvements in operating boom assemblies by automating such movements as discussed herein. Accordingly, the operator 218 may provide a single button press input to move boom assembly 204 from the stowed position of FIG. 2A to the ground position of FIG. 2B. When the input is received, a number of waypoints may be determined that the boom tip 210 may be moved through from a start position of the boom tip 210 to an end position. As discussed above, the boom assembly 204 may first be moved above the flight deck 222 before the waypoints are determined. Determination of the waypoints and other aspects of automating the movements of boom assembly 204 are discussed further below.

Figure 2C:
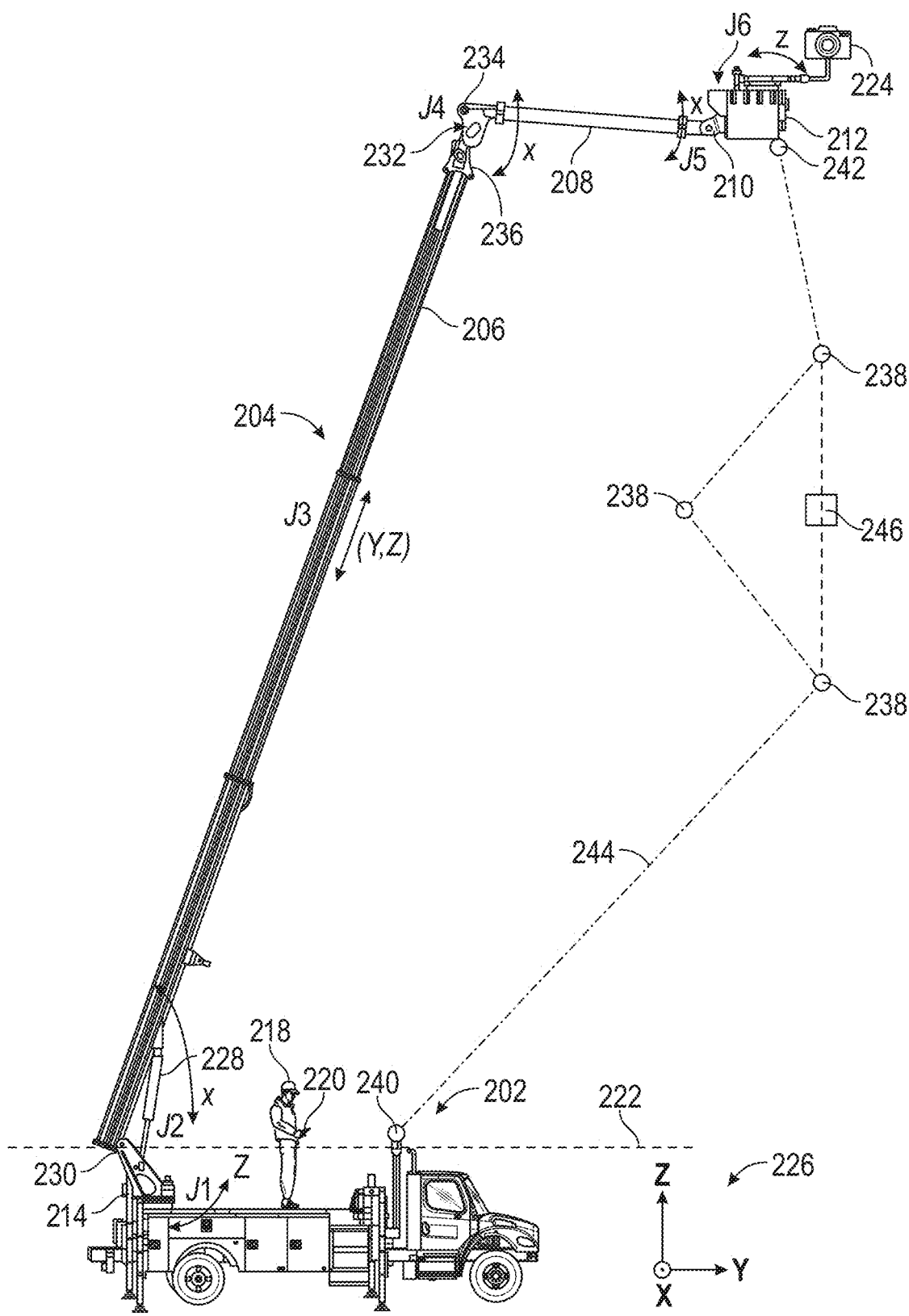
FIG. 2C illustrates the first aerial device in a working position for some embodiments.
Figure 2D:
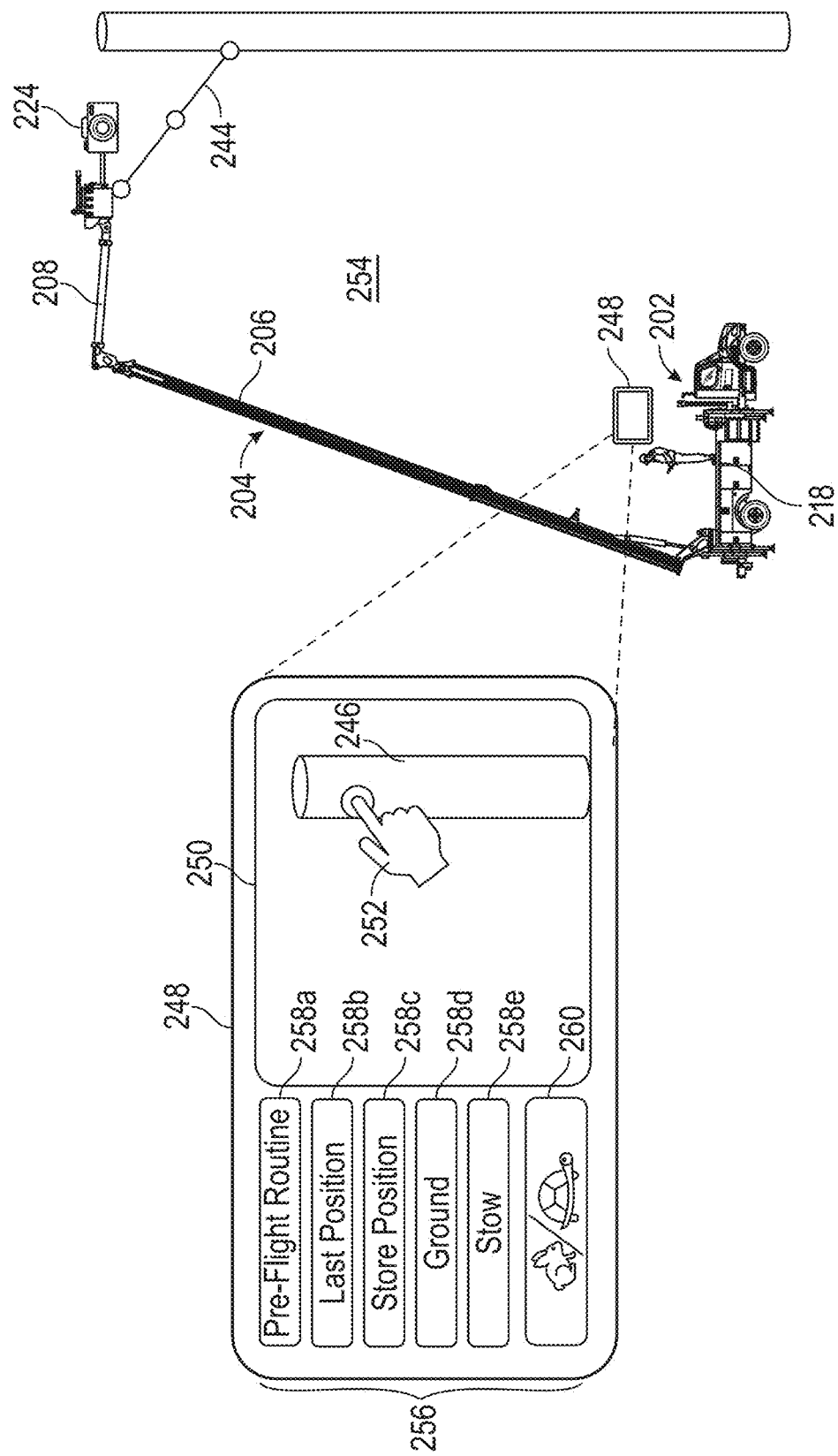
FIG. 2D illustrates an exemplary scenario of automatically moving the first aerial device to an end position specified by an operator.

Turning now to FIG. 2C, aerial device 200 is depicted in a raised, working position in accordance with embodiments of the present disclosure. FIG. 2C further depicts an exemplary embodiment of the joints of boom assembly 204 including joint 1 (J1), joint 2 (J2), joint 3 (J3), joint 4, (J4), joint 5 (J5), and joint 6 (J6). In some embodiments, J1-J6 are boom assembly joints that are automatically controlled based on input from the operator 218 to move aerial platform 212 to a particular location. A three-dimensional location (e.g., waypoint), may be provided by an operator 218 in a user interface (FIG. 2D) and/or via control device 220, and J1-J6 may be controlled to move aerial platform 212 and boom tip 210 to the location. In some embodiments, a generic location (e.g., "ground" or "adjacent utility pole") is provided, and an appropriate three-dimensional location is determined based on the generic location provided. In some embodiments, a video camera 224 (or other optical sensors) may detect the work environment and aerial platform 212 or boom tip 210 may be moved to the work environment autonomously. The video camera 224 may be located on or proximate aerial platform 212. In some embodiments, video camera 224 includes a 3D depth camera, as discussed in further detail below. As such, all actuators associated with operating J1-J6 may be controlled manually or autonomously.

In some embodiments, J1-J6 may comprise any actuators including electromechanically-operated, hydraulically-operated, pneumatically-operated, mechanically-operated, linear, non-linear, and rotary actuators. As such, any actuators may be used that may be controlled as discussed further below and may be operable by any energy source. The energy flow may be controlled by actuating valves controlling the flow of hydraulic or pneumatic fluid. Piston, pressure, and speed may be detected by the various sensors 122a described above to provide feedback to the control system 112. In some embodiments, the control system 112 includes or is otherwise associated with one or more controllers, which may comprise any linear, non-linear, and/or adaptive control. For example, one or more processors 114 may be configured as a controller. Control of the joint actuators by actuating valves is discussed in further detail below with respect to FIG. 1.

As shown, J1 comprises turntable 214 disposed on the utility vehicle 202. J1 may provide 360 degrees of rotation to boom assembly 204 such that aerial platform 212 may be placed on or near the ground to pick up operators 218 and reach the working environment. The rotation provided by J1 may be a rotation about the z axis (as labeled in FIG. 2C) provided at the turntable 214 in the displayed coordinate system 226. Along with articulation of lower boom 206 and upper boom 208, the automated motions of boom assembly 204 described herein may involve rotation of turntable 214, which may occur simultaneously or sequentially, with/to articulation of either boom 206, 208

J2, in some embodiments, comprises a second rotation of boom assembly 204. Specifically, J2 is the joint formed between lower boom 206 and turntable 214. J2, as shown, comprises a hydraulically actuated J2 cylinder 228 forcing lower boom 206 rotation about the x axis at lower boom linkage 230.

J3, in some embodiments, provides linear actuation along lower boom 206 of boom assembly 204. The linear actuation may be provided by a piston (not shown) on, or in, boom assembly 204 that may be actuated by hydraulic energy provided by a hydraulic motor at the utility vehicle 202 and operable by hydraulic valves.

J4, in some embodiments, comprises J4 cylinder 232, attached to upper boom 208 at J4 pivot point 234 providing rotation at J4 linkage 236. J4 may provide rotation of upper boom 208 relative to lower boom 206. J4 may comprise an actuator (e.g., J4 cylinder 232) configured to rotate upper boom 208 relative to lower boom 206 based on the commands provided by the input device 220. In some embodiments, J4 provides rotation about the x axis as shown, or the same rotational axis as J2.

J5, in some embodiments, comprises a joint between boom tip 210 and upper boom 208. J5 may provide rotation similarly to J2 and J4 about the x axis, as shown. J5, accordingly, enables rotation of boom tip 210 and aerial platform 212 relative to upper boom 208.

J6, in some embodiments, comprises a joint between boom tip 210 and aerial platform 212. As shown, J6 may provide rotation to aerial platform 212 relative to boom tip 210 about the z axis. In some embodiments, J6 provides rotation in more than one axis, such as about the z axis and about the y axis, or about any two axes.

Automated movements of boom assembly 204 are discussed further hereinafter. When the operator 218 provides an input to the input device 220 to perform an automated movement, such as to move the articulating boom assembly 204 to either the stowed position (FIG. 2A) or the ground position (FIG. 2B), a plurality of waypoints 238 may be automatically determined. Waypoints 238 are also referred to herein interchangeably as checkpoints. The checkpoints or waypoints 238 may be three-dimensional locations (e.g., Cartesian or polar coordinates) that the articulating boom assembly 204 guides the boom tip 210 and/or aerial platform 212 through in order to move the boom tip 210 to the desired end position. Thus, based on the determined three-dimensional locations, control system 112 may compute the requisite articulations, extensions, and other movements of boom assembly 204 to move boom tip 210 to the waypoints 238.

In some embodiments, when automatically moving aerial device 200, the waypoints 238 are defined in an XYZ coordinate space. Other coordinate systems may be employed. In some embodiments, a final or an end position 240 (here, the stowed position) for boom tip 210 is specified (e.g., by the operator 218), and subsequently a plurality of XYZ coordinate waypoints 238 are determined that the articulating boom assembly 204 then moves the boom tip 210 through to reach the end position 240 from a start position 242. The path through the waypoints 238 from start position 242 to end position 240 is referred to as the flight path 244. In some embodiments, the end position 240 is determined based on the commanded position of boom tip 210, such as based on an auto ground command being provided by operator 218 via input device 220. Thus, the end position 240 may correspond to a position where boom tip 210 is at or proximate the ground surface.

Determining the XYZ waypoints 238 may be based on the known machine geometry of boom assembly 204 and the articulation limits of the booms 206, 208. Thus, control system 112 may be configured to determine a finite number of possible waypoints 238 that the boom assembly 204 can reach based on the current pose thereof and to determine an optimal route to the end position based on the waypoints. The optimal route may be a shortest route by distance or the quickest route, for example. As another example, the optimal route may be a route that minimizes the energy required by the aerial device 200 to move the boom tip 210 to the end point. Pathfinding algorithms may be employed to determine an optimal path. In some embodiments, the waypoints 238 are stored as a coordinate or other list-type data structure, which may be modifiable as the boom assembly 204 moves through the successive waypoints 238 in the array.

As mentioned, the waypoints 238 may be checkpoints, where control system 112 is configured to determine whether aerial device 200 has met certain criteria before moving to the next checkpoint. In some embodiments, control system 112 utilizes three checkpoints: (1) go above the flight deck 222; (2) move the boom tip 210 in a straight line to the end position; and (3) go below the flight deck 222. These three checkpoints may be the three waypoints 238 stored in the array. Control system 112 may be configured to operate boom assembly 204 to sequentially advance through each of the checkpoints in the listed order. That is, control system 112 may first check whether boom tip 210 is above the flight deck. If not, control system 112 may cause boom assembly 204 to move to raise boom tip 210 above the flight deck. Then, a check will be made to move the boom tip 210 in a straight line towards the end position. In some embodiments, the checkpoint or waypoint 238 for moving boom tip 210 to the end position 240 is an XYZ position of the desired target (e.g., a utility pole top) that is a straight line from the position of the boom tip 210 when above the flight deck. The movement of the boom assembly 204 may be altered in the event an object is detected or some other external factor requires the boom assembly 204 to divert from the straight-line movement of the boom tip 210. In such a case, control system 112 may reroute the boom assembly 204 to avoid the object before returning to the straight-line path.

The last check may be whether the boom tip 210 is below the flight deck. This check may not occur until control system 112 is prompted by the operator 218. Thus, the operator 218 may perform any work necessary at the destination, signal control system 112 that the operator 218 is finished working (e.g., via input device 220), and then control system 112 may process the third checkpoint to lower boom tip 210 below the flight deck 222 to either ground or the towed position. As discussed in further detail below with respect to FIG. 3, moving the boom tip 210 in a straight line may be achieved using a velocity vector scheme coupled with a closed-loop position controller that tracks the performance of the boom tip 210 approaching the checkpoint.

As one example of employing checkpoints as described above, consider the case where the operator 218 selects an auto-to-ground function while boom assembly 204 is stowed. Thus, control system 112 may first process the first checkpoint to move the boom assembly 204 above the flight deck 222, which may involve moving the boom tip 210 to an XYZ position above the flight deck 222. Then the control system 112 may cause boom assembly 204 to move in a straight line towards the end position, which may involve slewing the turn table to rotate the boom tip 210 away from the utility truck. Lastly, the third checkpoint may be processed to move the boom tip 210 below the flight deck and to the ground position. As discussed herein, the determination of the checkpoints may be based on knowing the pose of the components of boom assembly 204 to select an XYZ position that satisfies the checkpoint and will not cause a collision or other unsafe operation.

Not all checkpoints may be employed every time the automated motion is selected by the operator 218. For example, if an auto-stow input is selected while boom tip 210 is operating at a pole top infrastructure, the first checkpoint may be ignored because the current position of the boom tip 210 (known by control system 112) is already above the flight deck 222. Thus, control system 112 may move straight to the straight-line motion to the end position 240, which may be an XYZ position having a height equivalent to the height of the flight deck 222. Subsequently, the third checkpoint of moving the boom assembly 204 below the flight deck 222 and to the stowed position may be carried out.

In some embodiments, control system 112 is configured to control articulating boom assembly 204 to move boom tip 210 between consecutive waypoints 238 in a straight line. Thus, each leg of the flight path 244 may comprise a straight line. In some embodiments, articulating boom assembly 204 is configured to move boom tip 210 between consecutive waypoints 238 in approximately a straight line (e.g., within 0-5 degrees deviation from a straight line between waypoints 238), where deviations from the straight line may be due to external factors, such as the wind acting on the boom tip 210, for example. Deviations from the straight line may also be based on detecting an impending collision, such as if an object 246 is in the path of the straight line. In some embodiments, when an object 246 is detected, an offset is applied to the straight-line motion velocity vector until it is determined the collision has been avoided. For example, the offset may shift the path of the boom tip 210 in any of the X, Y, or Z directions. Details on how articulating boom assembly 204 may be configured to move boom tip 210 in a straight line between waypoints 238 are discussed below with respect to FIG. 3.

As discussed above, there is a cognitive burden on operators of articulating boom assemblies to move the assembly to a desired location because of the articulating motion of the boom sections. This is in contrast to a telescoping boom that moves in a translational fashion. Therefore, by providing an articulating boom assembly that moves boom tip 210 in a straight line without requiring the operator to input the necessary boom articulations to do so, the operator experience is improved and accidental collisions may be mitigated.

FIG. 2D illustrates an exemplary application of an operator 218 selecting a desired end position 240 in accordance with embodiments of the present disclosure. Operator 218 is depicted using an input device 248, which may include a display screen 250 for displaying image data, such as video data received from video camera 224. The display screen 250 may be a touch screen operable to receive touch input from input device 248. Input device 248 may be the same or different as input device 220 discussed above. For example, in some embodiments a keypad input device 220 is provided (see, e.g., FIG. 7), along with a tablet input device 248. Other input devices (e.g., a radio remote control) may be used as discussed above.

The video data displayed on display screen 250 may, for example, be a video stream received from video camera 224 at boom tip 210. As mentioned, one or more video camera 224 may be disposed at boom tip 210 for capturing real-time video from the boom tip 210. Video camera 224 may be a 3D depth camera for capturing three-dimensional depth information. Generally, any type of video camera 224 and/or any number of video cameras may be employed.

Operator 218 may provide an input 252, such as a touch press on display screen 250, to define a desired end position 240 in the environment 254. Using the 3D depth information from video camera 224, the input 252 may be translated into an XYZ position for the end position 240. In some embodiments, the 3D camera 224 (or control system 112) is configured to determine a distance from the 3D camera to the position selected via the display screen 250, and this selected position can be set as the end position 240. In some embodiments, a relative position of the boom tip 210 that is relative to a target selected via the display screen 250 (e.g., the utility pole) is determined. For example, when the utility pole is selected, the end position 240 may instead be set relative to or at an offset to the utility pole such as a 3-foot offset or any other distance. As another example, an offset may be set when selecting the ground as the target via the display screen 250, and the end position may be some distance offset or relative to the ground surface. The relative position/distance may be configurable by the user. Accordingly, a flight path 244 may be generated to move boom tip 210 to the end position 240 as discussed herein.

Input device 248 may also comprise a number of controls 256 that operator 218 may select to cause a corresponding movement in boom assembly 204. When a control 256 is selected, waypoints 238 may be computed to fly boom tip 210 from the start position 242 to the desired end position 240, where the computation of the waypoints may depend on the selected control 256. In some embodiments, as with button inputs on input device 220, the controls 256 are configured as momentary inputs such that the operator 218 is required to continuously hold or press the control 256 to move the boom assembly 204 to the end position 240 associated therewith. If a control 256 is released, movement of boom assembly 204 may pause (via closing of corresponding hydraulic valves, for example) until a control 256 is again actuated. Controls 256 may be displayed on display screen 250, may be provided as separate physical buttons proximate display screen 250, or may be located on input device 220.

In some embodiments, controls 256 includes a first control 258a that is a pre-flight routine control. When selected, boom assembly 204 may actuate boom assembly 204 through a predefined pre-flight routine. For example, the pre-flight routine may involve extending each articulator to an articulation limit to ensure correct working of the boom assembly 204. The specific positions that the boom assembly 204 goes through for the pre-flight routine may be definable by operator 218.

A second control 258b may be a last position control, which when actuated, may cause boom assembly 204 to move to a last working position or a last stored position. A third control 258c for storing a position of boom tip 210 may also be provided, which may store a current position of boom tip 210. Thus, for example, boom tip 210 could be positioned in a working position, such as a proximate a utility pole, and at the end of the workday, the operator could store the position using third control 258c. The next workday, the second control 258b could be used to return boom tip 210 to the working position (as the boom assembly 204 is typically stowed at the end of a workday) without requiring the complex series of inputs required to articulate boom assembly 204 back to the working position.

A fourth control 258d for moving boom assembly 204 to the ground position and a fifth control 258e for moving boom assembly 204 to the stow position may also be provided. As discussed above, actuation of these controls 258d, 258e may cause boom assembly 204 to move to the selected position. Control system 112 may then calculate waypoints 238 to move boom tip 210 to the selected end position, where the calculation of the waypoints may be based on at least the known pose of the boom assembly 204 (e.g., position and orientation of lower boom 206, upper boom 208, boom tip 210, or any combination thereof).

Input device 248 may further include a speed control 260. Speed control 260 may be a toggleable control option for the operator 218 to set a fast mode or a slow mode to control how quickly the boom assembly 204 moves when a control 256 is selected. For example, when the boom assembly 204 is far from the end position 240 and the operator 218 determines there is minimal risk of an accidental collision, operator 218 may set speed control 260 to operate boom assembly 204 at a higher speed. Similarly, when boom assembly 204 is nearing the desired end position 240, the operator may switch to slow mode to reduce the risk of a collision. In some embodiments, the speed of boom assembly 204 is automatically controlled based on a distance of boom assembly 204 to the end position 240 and/or to other objects 246 or boundaries. In some embodiments, the speed of boom assembly 204 is controlled based on valve commands sent by the processing system to the corresponding valves that provide hydraulic fluid to operate the actuators on boom assembly 204. For example, when in the fast mode, the valves may be commanded to enable a higher flow rate of the hydraulic fluid as compared to the slow mode to enable quicker motion of the boom assembly 204.

Figure 3:
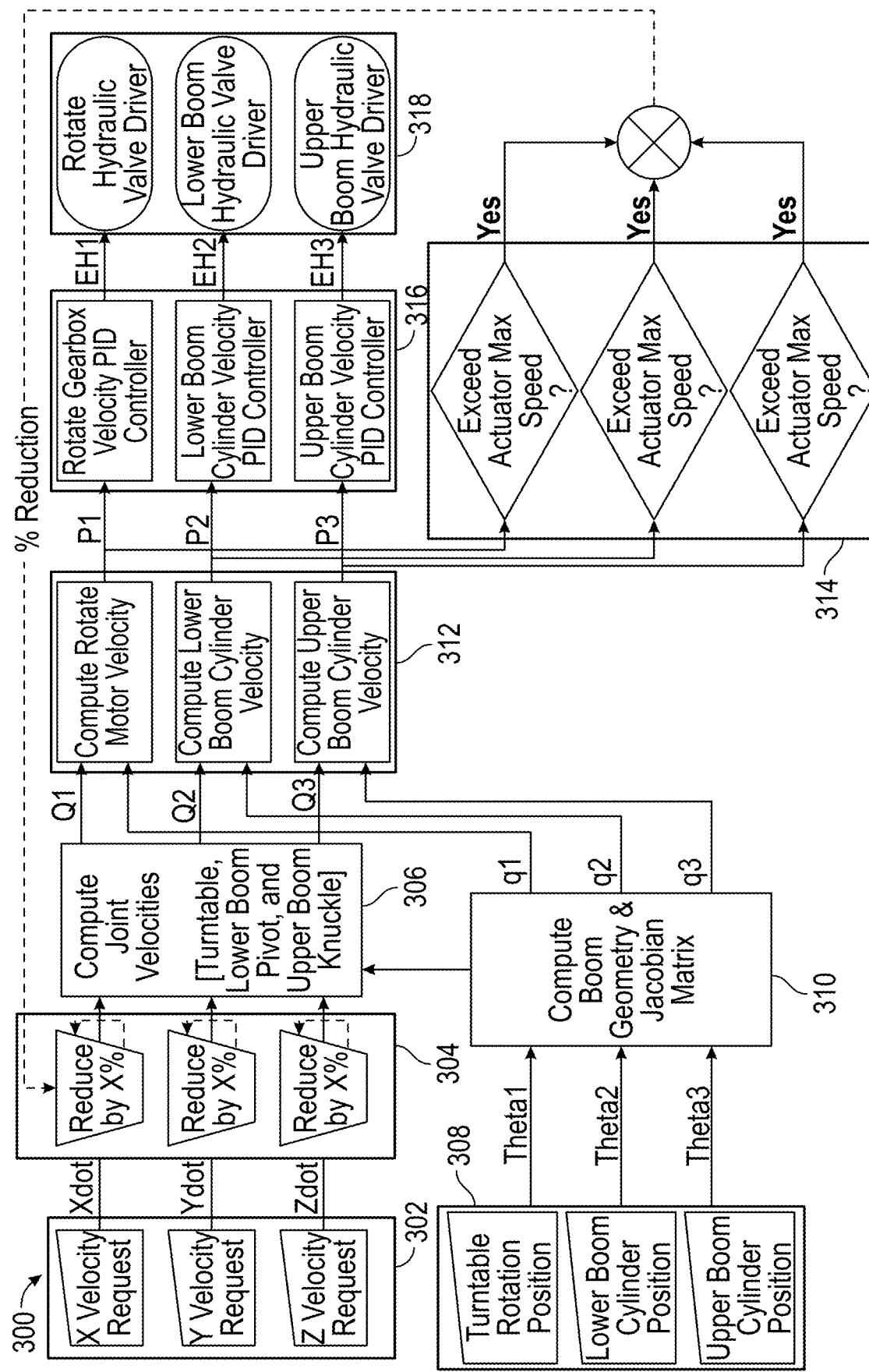
FIG. 3 illustrates an exemplary flow diagram for moving a boom tip of an aerial device for some embodiments.

FIG. 3 depicts an exemplary flow diagram 300 for driving boom operation using the above-mentioned velocity vector scheme coupled with a closed-loop position controller relating to some embodiments. The process steps of exemplary flow diagram 300 may be carried out by the aerial devices described herein when moving a boom assembly through waypoints such that the boom tip is moved in a straight line by controlling the velocity of the boom assembly. In some embodiments, the process steps of exemplary flow diagram 300 are configured to be executed by control system 112 on a boom assembly.

In some embodiments, at an operator input stage 302, one or more operator inputs are received or determined for each of three Cartesian coordinate directions. For example, a velocity input value may be received or determined for at least one of the X-direction, Y-direction, and Z-direction. In some embodiments, control system 112 is configured to determine the X, Y, and Z velocity values to move the boom tip 210 to the desired end position 240. Additionally, embodiments are contemplated in which velocities may be received and computed for any number of directions. Further still, in some embodiments, velocities may be included for any combination of linear directions and rotational directions. For example, in some embodiments, inputs may be received for a motion control system having six degrees of freedom. In some such embodiments, the operator inputs may be requested by an operator 218 via an input device 220. In some embodiments, a saturation reduction stage 304 may be included in which a percentage reduction is received to reduce the requested velocity values if at least one of the requested values is saturated, as will be described in further detail below. Accordingly, the speed associated with the flight path 244 may be monitored, and if the speed exceeds a predetermined threshold, the speed may be reduced for each of the three Cartesian directions.

In some embodiments, a joint velocity computation stage 306 may be included in which a joint velocity is computed for at least one joint (e.g., J1-J6) of the boom assembly where the joint velocity is based on the velocity values determined based on the desired end position 240 and a Jacobian matrix for the boom assembly 204. For example, a joint velocity may be computed for each of the turntable 214, the lower boom 206, and the upper boom 208 (i.e., joints J1, J2, J4). In some embodiments, the joint velocity computation stage 306 provides a flight path for the boom assembly including a plurality of joint velocities to achieve the requested Cartesian velocities at a predetermined point on the boom assembly 204. For example, in some embodiments, the flight path 244 may be generated to achieve a specific velocity vector or position vector of the boom tip 210.

Further, in some embodiments, a feedback sensor input stage 308 may be included for receiving one or more position inputs indicative of a measured current position of the boom assembly 204. In some embodiments, the position inputs may be received from one or more sensors 122a disposed within the joints J1-J6 or otherwise configured to measure the position of the joints J1-J6 of the boom assembly 204. For example, any of a rotary encoder, linear potentiometer, angular potentiometer, gyroscope, other position sensitive sensor (angular or linear), or combinations thereof may be incorporated into the joints J1-J6 of the boom assembly 204. In some embodiments, one or more extension sensors may be included for measuring the extension of the boom cylinders. For example, in some embodiments, one or more string potentiometers may be included internally within the one or more cylinders of the boom assembly 204 for measuring an extension of the respective cylinder. In some embodiments, other types of extension measurement devices may be used such as, magnetostrictive sensors or hall-effect sensors. Similarly, in some embodiments, one or more rotary encoders may be disposed on the boom assembly for measuring an angle of rotation of respective joints of the boom assembly.

In some embodiments, a boom geometry computation stage 310 may be included for computing the boom geometry and Jacobian matrix based on the received position inputs from the feedback sensor input stage 308 and known dimensions and geometries of the boom assembly, which may be stored in memory 116 as previously discussed. In some embodiments, a plurality of predetermined parameters may be received prior to operation indicating the dimensions of the components of articulating boom assembly 204, including any of booms 206, 208, boom tip 210, aerial platform 212, or turntable 214. In some embodiments, the Jacobian matrix may be generated by taking the partial derivative of the transformation matrix with respect to the position inputs. The Jacobian matrix may then be provided to the joint velocity computation stage 306 for computing individual joint velocities. In some embodiments, an actuator velocity conversion stage 312 may be included for converting the joint velocities of the joint velocity computation stage 306 into actuator velocities based on the geometry of the boom assembly 204 and specific linkages associated with each joint J1-J6. Accordingly, in some embodiments, the boom geometry computed at the boom geometry computation stage 310 may be provided to the actuator velocity conversion stage 312. Additionally, embodiments are contemplated in which matrix calculations may be performed ahead of time and results (including a plurality of reference values) may be stored in a look-up table or other storage format in memory 116. In some such embodiments, the real-time parameters may be used to approximate between reference values in the look-up table.

Accordingly, the processing burden may be reduced during real-time operation such that control latency is further reduced.

In some embodiments, a saturation check stage 314 may be included for limiting the XYZ direction velocity input values based on the physical flow limits of the boom assembly 204. For example, the boom assembly 204 may be at least partially hydraulically actuated such that each hydraulic actuator is associated with a physical flow limit. Further, the sum of all actuators may saturate the flow beyond what a hydraulic pump of the boom assembly 204 is able to produce. Accordingly, the saturation check stage 314 may determine whether any of the actuator limits have been exceeded by the currently requested velocities, and if at least one of the physical flow limits is exceeded, a percentage reduction may be applied at the saturation reduction stage 304. In some such embodiments, a percentage value for the reduction may be calculated such that the X, Y, and Z velocity inputs are reduced by the same amount until the flow limits are within the limits of the actuators. Alternatively, in some embodiments, a predetermined reduction value may be used. For example, each of the velocities may be reduced by 1%, 50%, or another suitable percentage. In both cases, the reduction in each of the X, Y, and Z velocities is equivalent to maintain the path accuracy. Conversely, if none of the flow limits are exceeded, the percentage reduction may not be applied at the saturation reduction stage 304 or a percentage reduction of 0% may be applied.

In some embodiments, a valve command controller stage 316 may be included. Here, a valve command may be generated for each of the actuator velocities of the actuator velocity conversion stage 312. In some embodiments, one or more PID controllers may be included for a plurality of hydraulic valves of the boom assembly 204. Accordingly, the PID controllers may be configured to receive a signal indicative of the requested actuator velocities and generate valve commands accordingly. The PID controllers may be part of control system 112, and the signals may be generated by processors 114.

In some embodiments, an output valve command stage 318 may be included in which the valve commands are transmitted to the hydraulic valve drivers for adjusting the hydraulic valves to achieve the requested velocities. In some embodiments, the hydraulic valves may be electrically actuated such that the valve commands are received as electrical signals, and each valve is operated based on the respective electrical signal. In some embodiments, a hydraulic valve may be included in the boom assembly 204 corresponding to each joint J1-J6 of the boom assembly 204. In some embodiments, the valves may be disposed at each joint J1-J6. Alternatively, in some embodiments, the valves may be included in a common location such as on a hydraulic manifold disposed at the turntable 214. For example, a rotate hydraulic valve may be disposed in or adjacent to the turntable 214, a lower boom hydraulic valve may be disposed in or adjacent to the lower boom 206, and an upper boom hydraulic valve may be disposed in or adjacent to the upper boom 208. In some embodiments, the flight path 244 may be realized by adjusting the extension of the various hydraulic cylinders of the boom assembly 204.

In some embodiments, an extension of one or more telescoping sections of the boom assembly 204 may be controlled in a similar fashion as described above. As previously discussed, in some embodiments, lower boom 206 has one or more telescoping sections as shown in FIG. 2C. In some embodiments, one or more of lower boom 206 and upper boom 208 has one or more telescoping sections.

For example, the extension length of the telescoping section may be retracted or extended based on a received movement request from the operator 218. Typically, movements such as boom extension are controlled separately from other movement of the boom assembly 204. However, embodiments are contemplated in which the extension of the telescoping section may be adjusted in unison along with other movements of the boom assembly. For example, an operator may request an upward movement of the boom tip 210, and the telescoping section may be extended upward while the hydraulic cylinders are simultaneously adjusted in response to the requested movement. In some embodiments, a machine architecture is provided including four actuators, for example, the boom assembly 204, including the turntable 214, the lower boom 206, and the upper boom 208, as well as a telescoping section of the boom assembly 204 as a fourth actuator. In some embodiments, to account for a fourth actuator in a three degrees of freedom motion system, any of a maximizing stability parameter, a stationary pose parameter, or a maximizing capacity parameter may be used to add an additional constraint to dictate a solution of the fourth actuator. In some embodiments, similar approaches may be applied for systems with any number of actuators, for example, in a system having seven actuators and six degrees of freedom.

Further, embodiments are contemplated in which additional parameters may be considered while calculating the flight path 244. For example, in some embodiments, a current payout length of a winch line disposed on the boom assembly 204 may be considered. Here, the payout length may be monitored such that the winch line is not extended past a maximum available length to avoid two-blocking and potential damage. Two-blocking may refer to a condition in which a lower load comes in contact with a higher load leading to substantially large forces applied to the boom assembly 204. Accordingly, embodiments are contemplated in which the flight path 244 may be adjusted based on the payout length of the winch line to prevent a two-blocking condition of the boom assembly 204.

It should be understood that a number of different flight paths 244 may be present for a given end position 240. Accordingly, in some embodiments, various optimizations to the generated flight path 244 may be applied. Here, various adjustments to the flight path 244 may be implemented, for example, based on any of objects 246, singularities, types of work operations, and/or other factors. In some embodiments, the flight path 244 may be optimized to provide maximized structural strength to the boom assembly 204. Additionally, in some embodiments, the flight path 244 may be optimized for energy conservation. For example, the shortest collective flight path 244 to a destination position for all (or a subset) of the joints J1-J6 may be chosen. Further still, flight paths 244 may be selected based on avoiding collisions and singularities of the boom assembly 204.

In some embodiments, the flight path 244 may be calculated using a closed-form inverse kinematics function. Here, the closed-form inverse kinematics may provide a significantly faster approach to generating a flight path 244 as compared to open form calculations that typically rely on guess and check methods to converge onto a solution, which consumes large amounts of processing time and generates substantial input latency. The closed-form inverse kinematics may use predetermined mathematical parameters for the boom assembly 204 that factor in the geometries and dimensions of the boom assembly 204 such as the dimensions of each of the components of the boom assembly 204. Accordingly, the lengths of the members of the boom assembly 204 may be automatically accounted for and worked out ahead of time to thereby simplify the real-time calculations that are performed during operation. In some embodiments, the predetermined parameters of the boom assembly 204 allow a closed-form technique to be used that receives one or more inputs and generates one or more outputs without requiring guess and check or repeated iterations to provide a solution.

In some embodiments, the flight path 244 may be determined for a suspended load, for example, disposed at the boom tip 210. In some such embodiments, a suspended load may be held at the boom tip 210 on or in place of the utility platform 212. For example, in some embodiments, a utility pole or other object may be gripped and supported at the boom tip 210. Accordingly, the control inputs may be received requesting to execute motion of the suspended load. Accordingly, the operator 218 can intuitively control the positioning and orientation of the suspended load.

In some embodiments, various forms of load monitoring may be applied to monitor one or more loads of the boom assembly 204. Accordingly, in some embodiments, haptic feedback and/or other forms of feedback may be generated in response to a detected load. A feedback response may include any combination of haptic feedback such as vibration of a controller (e.g., input device 220) or other user device, visual feedback such as a flashing light, or audible feedback such as a ringing alarm. In some embodiments, an intensity or frequency of the feedback may be determined proportional to the load. For example, a less intense feedback response may be generated for a load of 200 pounds as compared to a load of 500 pounds.

Further, in some embodiments, the intensity (or frequency) of the feedback response may be selected granularly based on a comparison of a measured load to a predetermined maximum load value such that the intensity increases as the measured load approaches the maximum load value. In some embodiments, the intensity and/or frequency may vary according to an exponential function such that load changes at higher loads closer to the maximum load value are more noticeable to the operator 218. In some embodiments, linear functions and other types of feedback functions are also contemplated. In some embodiments, the intensity and/or frequency of the feedback response may become saturated after a certain load value is exceeded. For example, in some embodiments, the feedback response may become saturated when the maximum load value is exceeded such that the feedback response is similar at and above the maximum load.

In some embodiments, the feedback response may be communicated such that the operator is notified without looking away from the work area or losing focus. For example, any of vibration, lights, or an audible alarm may be employed and communicated to the operator 218 via input device 220 or another output apparatus associated with aerial device 200.

Additionally, embodiments are contemplated in which the velocities of the boom cylinders and the flight path 244 may be automatically adjusted based on one or more measured loads. For example, if a heavy load of 400 pounds is suspended at the boom tip 210, the velocities of the valve commands may be automatically increased such that the boom assembly 204 moves at a similar speed as if there was no load suspended at the boom tip 210. Alternatively, in some embodiments, the valve commands may not be increased based on a measured load such that the boom assembly moves slower while supporting a heavy load to ensure additional caution. Further, in some embodiments, pressure-compensated hydraulic valves may be used such that the motion speeds are independent of varying load amounts. Further still, embodiments are contemplated in which allowed accelerations of the boom assembly 204 are limited based on a sensed load to thereby minimize dynamic loading conditions and shock loading on the structures of the boom assembly 204. For example, if a heavy load of 400 pounds is being supported at the boom tip 210, an acceleration limit may be reduced based on the 400 pounds of additional weight to prevent dynamic loading effects and shock associated with quickly accelerating a large load.

Figure 4:
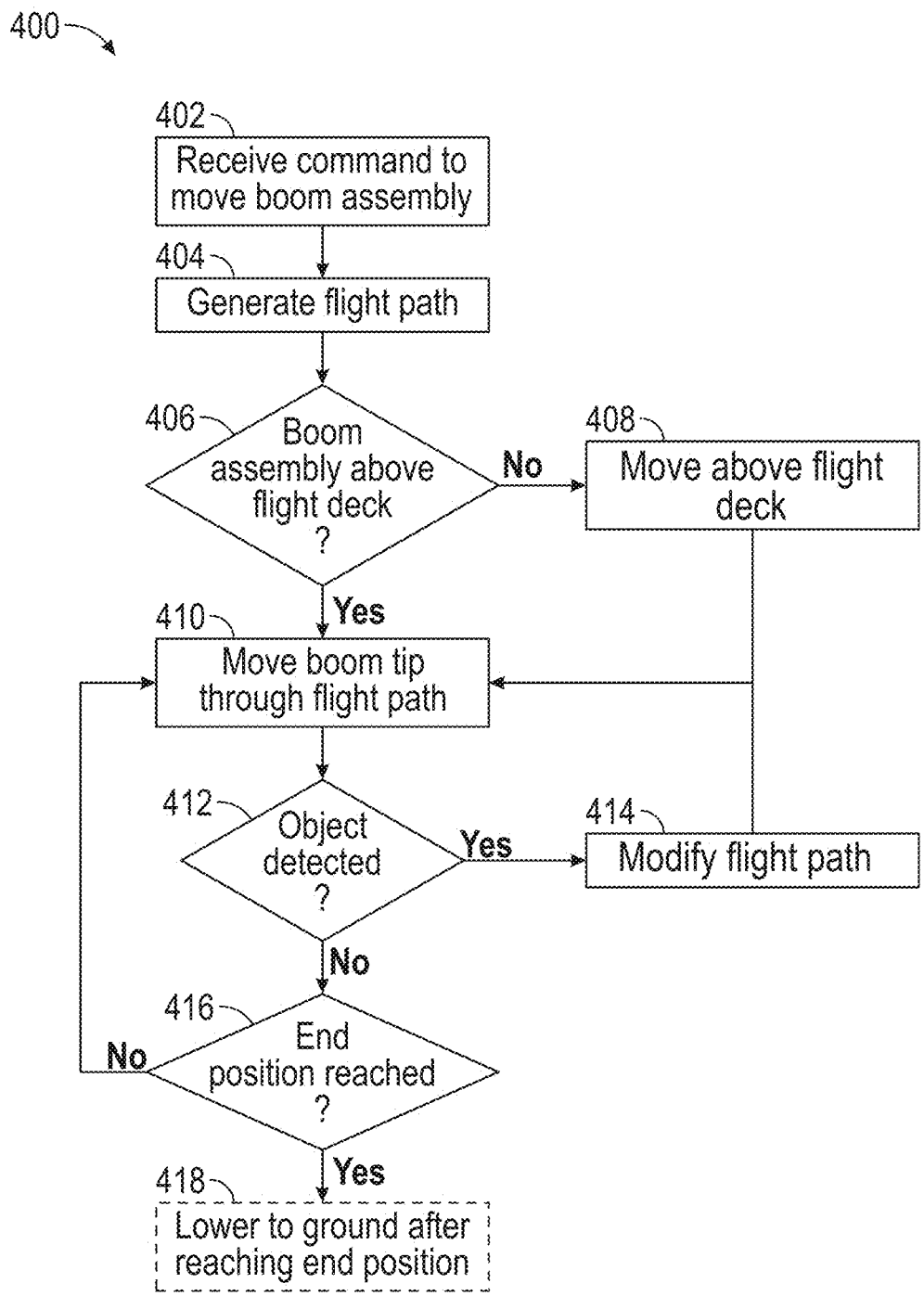
FIG. 4 illustrates an exemplary method for some embodiments.

FIG. 4 illustrates a method 400 of automatically moving boom tip 210 to a desired end position 240 in accordance with embodiments of the present disclosure. First, at step 402, a desired end position 240 may be received. The desired end position 240 may be a position in XYZ space and may be determined based on the input provided via input device 220. For example, if the end position is a stow position of the boom assembly 204, the XYZ position may be (0, 0, 0) as the stow position may be an origin position of the boom assembly 204. In some embodiments, the XYZ position is of the boom component being guided to the end position, e.g., the boom tip 210. Control system 112 may be configured to compute the XYZ coordinates of the end position 240 based on the input provided by the operator 218. As previously discussed, the operator 218 may provide automated commands via an input device 220, 248, such as an auto ground command, an auto stow command, a return to working position command, a pre-flight routine command, by selecting a point on display screen 250, or the like.

At step 404, a flight path 244 comprising waypoints 238 from a start position 242 to an end position 240 may be generated. In some embodiments, the path between successive waypoints 238 is a straight line. Further, the generation of the plurality of waypoints 238 may be based on the known pose of the aerial device 200 as discussed above with respect to FIG. 3. In some embodiments, the list of coordinates waypoints 238 is stored as an array or other linear data structure, which may be stored in a memory (e.g., memory 116) associated with aerial device 200. The array or list of waypoints may be modifiable in real time, such as in response to detecting on object 246 along the flight path 244.

Processing may then proceed to test 406, where it may be determined whether articulating boom assembly 204 is above the flight deck 222. This may be the first checkpoint processed by control system 112 as discussed above. As previously discussed, the flight deck 222 may be a vertical distance above the ground, above the utility vehicle 202, or may be any other reference point above which articulating boom assembly 204 must be raised before moving to a desired end position 240 is permitted. Moving articulating boom assembly 204 above the flight deck may prevent collisions with utility vehicle 202 and/or the operators 218 on the utility vehicle 202. The determination of whether boom assembly 204 is above the flight deck 222 may be based on data received from the 122a that provide positional data of the boom assembly 204 during operation.

If, at test 406, articulating boom assembly 204 is not above the flight deck 222, processing may proceed to step 408 where articulating boom assembly 204 is raised above the flight deck 222. Processing may then proceed back to test 406. In some embodiments, moving boom assembly 204 above the flight deck 222 comprises determining an end position 240 that is above the flight deck and moving the boom tip 210 from the start position 242 through a series of waypoints 238 to place boom assembly 204 above the flight deck 222. After step 408, processing may proceed to step 410.

If articulating boom assembly 204 is above the flight deck 222, processing may proceed from test 406 to step 410. In some embodiments, the ordering of steps 404 and test 406 are reversed such that it is determined whether the boom assembly 204 is above the flight deck before generation of the flight path 244. In some such embodiments, a flight path 244 (including one or more waypoints 238) may be generated where the end position 240 places the boom assembly 204 above the flight deck 222. The determination of waypoints and moving of the boom tip 210 to the end position in a straight line may be the second checkpoint discussed above.

At step 410, articulating boom assembly 204 may move boom tip 210 through the flight path 244 by moving boom tip 210 to each coordinate waypoint 238 in the flight path 244. During the movement, articulating boom assembly 204 may articulate such that boom tip 210 is moved in a straight line. The velocity of boom assembly 204 may be controlled while moving boom tip 210 between waypoints 238 as described with respect to FIG. 3.

Thereafter, at test 412, it may be determined whether an object 246 has been detected. If yes, processing may proceed to step 414, and a new waypoint 238 may be determined. The flight path 244 may then be modified to include the new waypoint 238 at step 414. In some embodiments, modifying the flight path 244 may include adding the new waypoint 238 to the flight path 244, e.g., to the array of coordinates. In some embodiments, modifying the flight path 244 may include removing one or more waypoints 238 from the flight path, such as waypoints 238 that would lead to a collision with the object 246. Detection of an object 246 may be done using various sensors as discussed with respect to FIGS. 1 and 2D. The new waypoint 238 may be any waypoint 238 that avoids a collision with the object 246. The motion of other components of the boom assembly 204 may also be modified if it is determined a component will collide with the object 246. For example, if it is determined that the upper boom 208 will collide with the object while moving the boom tip 210 to the end position, the motion of the boom tip 210 may be modified to avoid the collision. The determination that a component may collide with the object may be done based on knowing the pose of the component, the path that the component will take to move the boom tip 210 to the end position 240, and the location of the object.

If an object is not detected at test 412, processing may proceed to test 416, where it may be determined if the end position 240 has been reached. If the end position 240 has been reached, processing may proceed to optional step 418, where the boom tip 210 may be lowered to the ground position. This may be the third checkpoint discussed above. It will be appreciated that a delay may occur before step 418 is carried out, such as a delay sufficient for an operator 218 to perform any necessary work functions while at the end position 240. In some embodiments, step 418 does not proceed until an input from operator 218 is received. If, at test 416, the end position 240 has not been reached, processing may proceed back to step 410 where boom assembly 204 continually moves through the flight path 244. Method 400 may be implemented on any of the aerial devices described herein, such as the aerial device 500 described with respect to FIGS. 5A-5D.

Figure 5A:
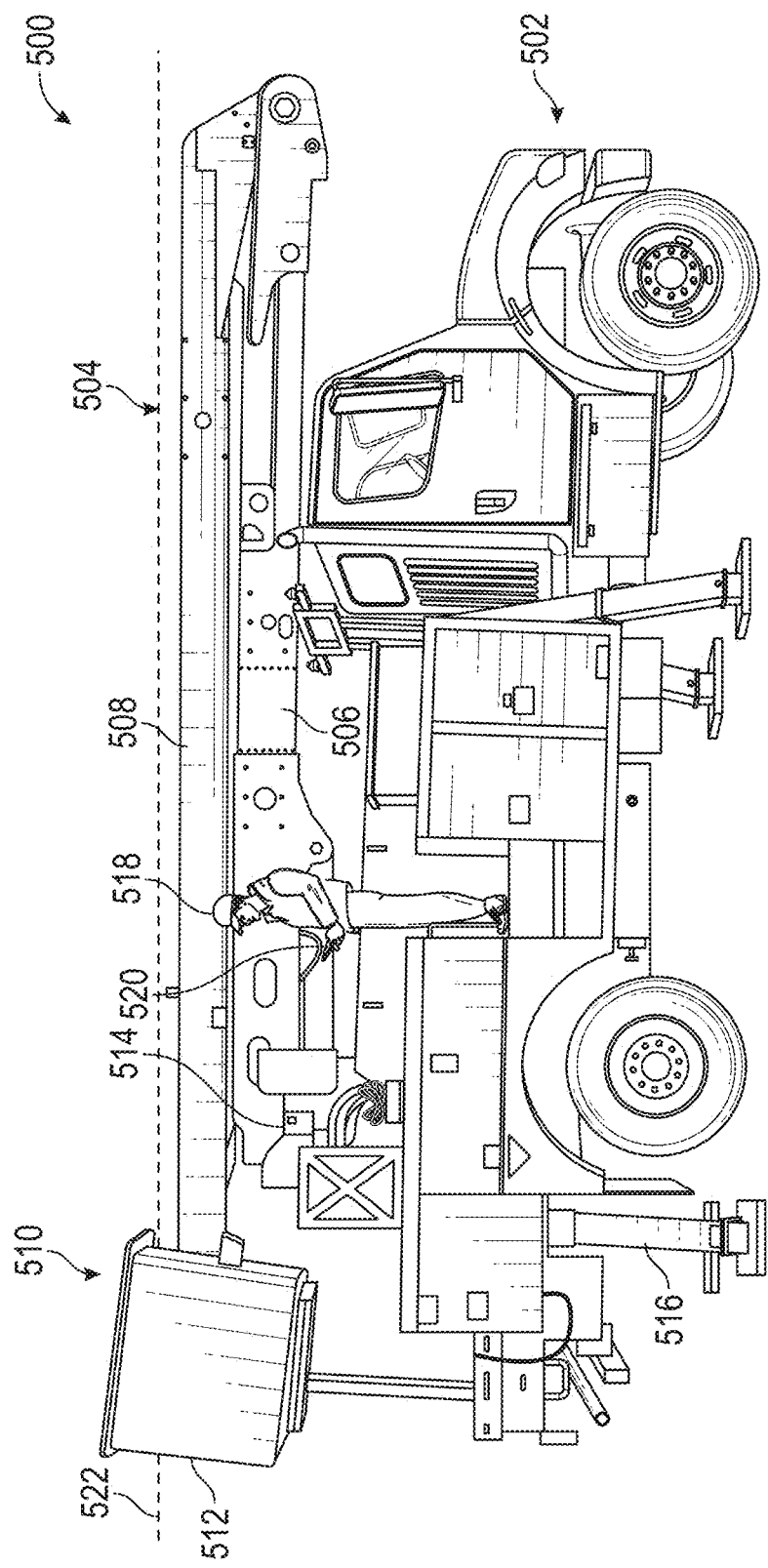
FIG. 5A illustrates a second aerial device in a stowed position for some embodiments.
Figure 5B:
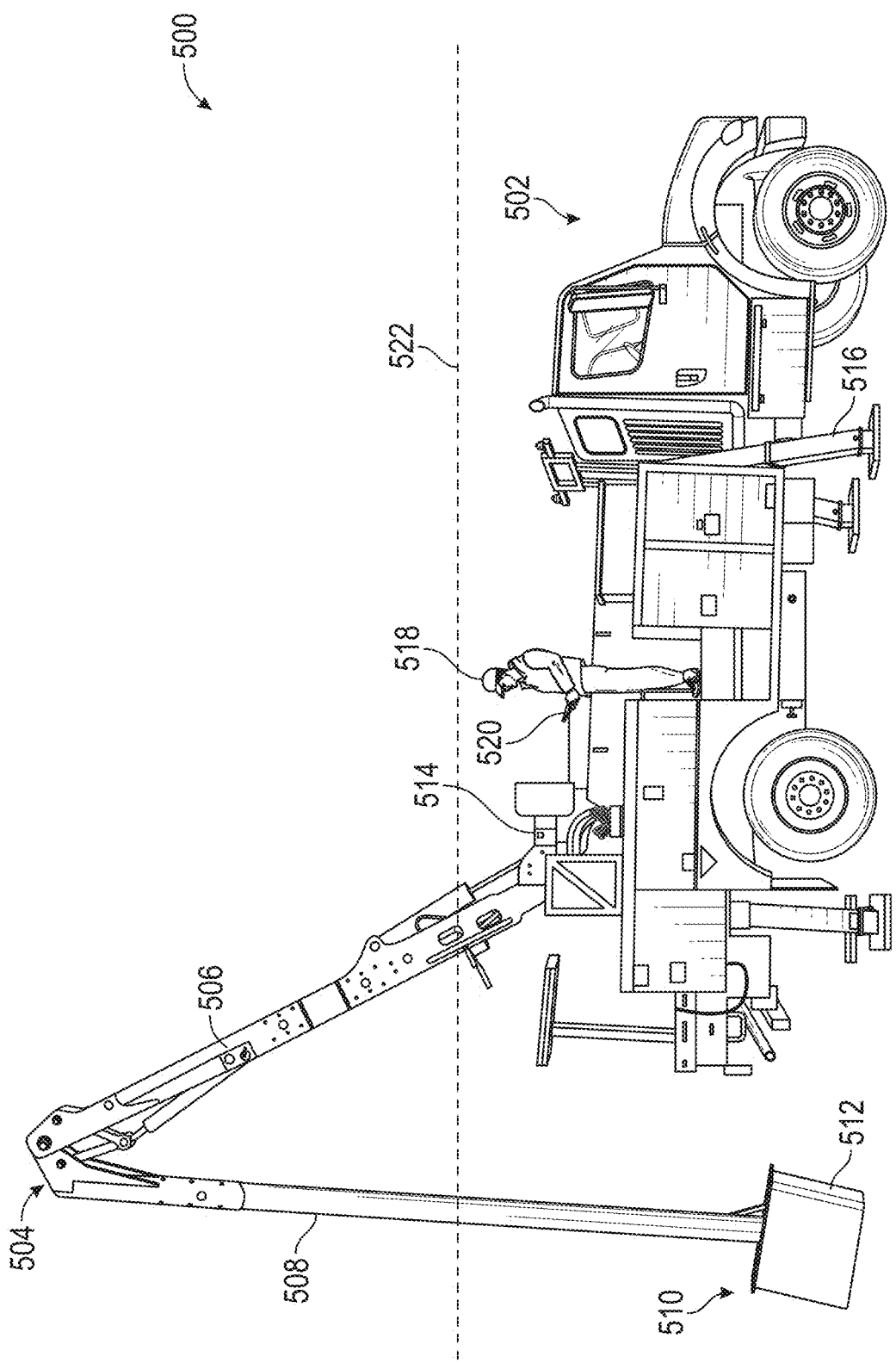
FIG. 5B illustrates the second aerial device in a ground position for some embodiments.

Turning now to FIGS. 5A and 5B, a second aerial device 500 is illustrated in accordance with embodiments of the present disclosure. FIG. 5A depicts aerial device 500 in the stowed position, and FIG. 5B depicts aerial device 500 in the ground position. Aerial device 500 may be substantially similar to aerial device 200 discussed above. Aerial device 500 may be supported by a utility vehicle 502, and may comprise an articulating boom assembly 504, a lower boom 506, an upper boom 508, a boom tip 510, an aerial platform 512, and a turntable 514. Utility vehicle 502 may include deployable outriggers 516 for stabilizing articulating boom assembly 504. In contrast to aerial device 200, aerial device 500 may have upper boom 508 folded over lower boom 506 in the stowed position. An operator 518 may use an input device 520 to control the movement of aerial device 500.

Also, in contrast to aerial device 200, in some embodiments, when automatically moving aerial device 500, the waypoints or checkpoints may be target angles of one or more joints J1-J6 of the aerial device 500. The joints J1-J6 may be the same as in aerial device 200. In some embodiments, at least two target joint angles are provided. A first target joint angle may be an angle at the joint J4 between upper boom 508 and lower boom 506. A second target joint angle may be a joint angle made at the joint J2 between lower boom 506 and turntable 514. In some embodiments, a third target joint angle associated with J1 and the rotation of turntable 514 is also provided. Furthermore, in some embodiments, fourth and fifth target joint angles for aerial platform 512 relative to boom tip 510 may be provided. In some embodiments, aerial platform 512 is rotatably coupled to boom tip 510 and may rotate about two axes relative to boom tip 510 as discussed with respect to FIG. 2C such that the fourth target joint angle may be the rotation about the x axis and the fifth target joint angle may be the rotation about the z axis. As one example, when in the stowed position, aerial platform 512 may have a target angle of about 0 degrees about the z axis, while when in the ground position, the aerial platform 512 have a have a target angle about the z axis of about 30 degrees away from boom tip 510 to provide additional space for the operator 518 to enter or exit the aerial platform 512.

Figure 5C:
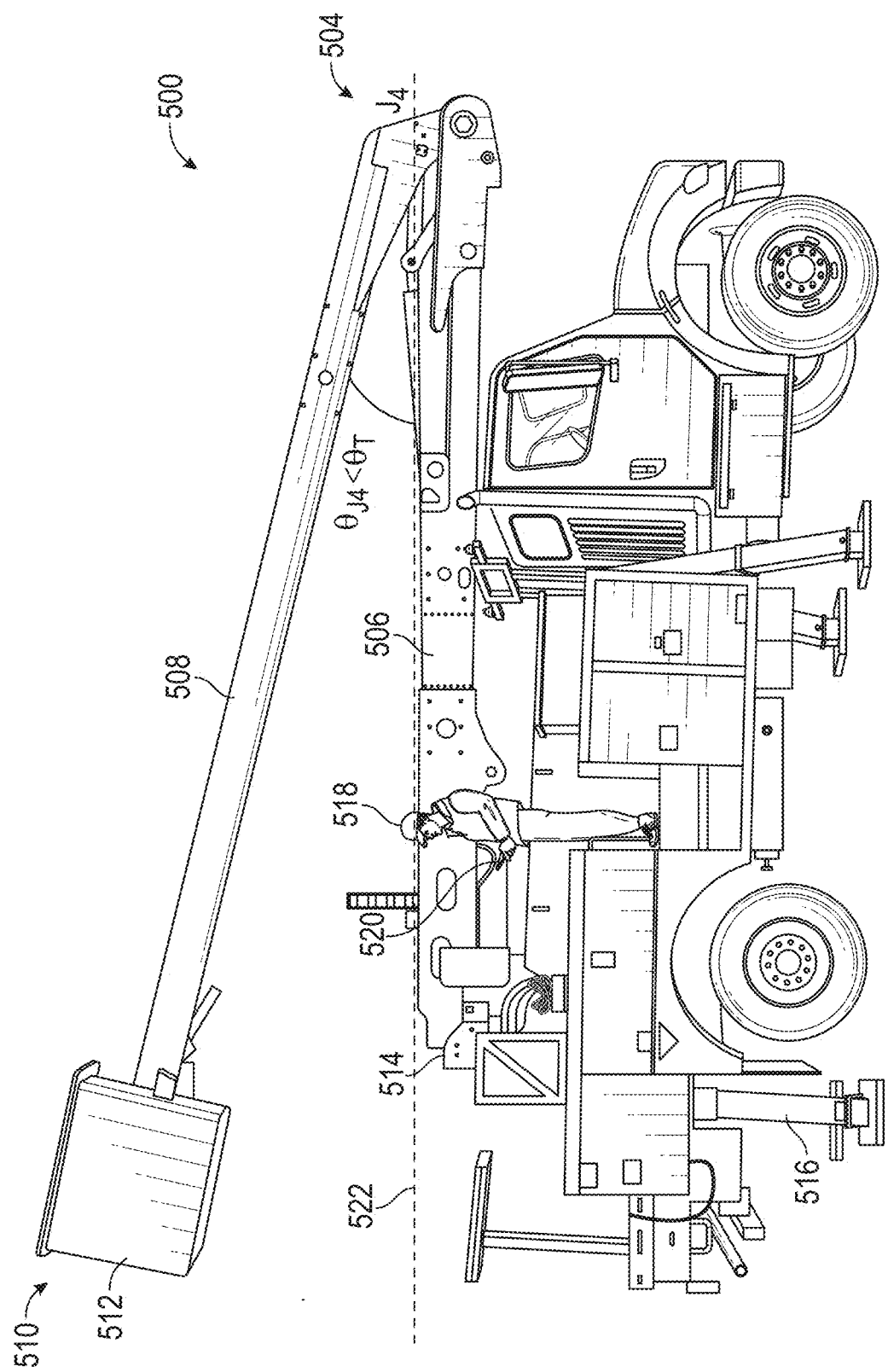
FIGS. 5C and 5D illustrate the second aerial device in an intermediate position between the stowed position and the ground position for some embodiments.
Figure 5D:
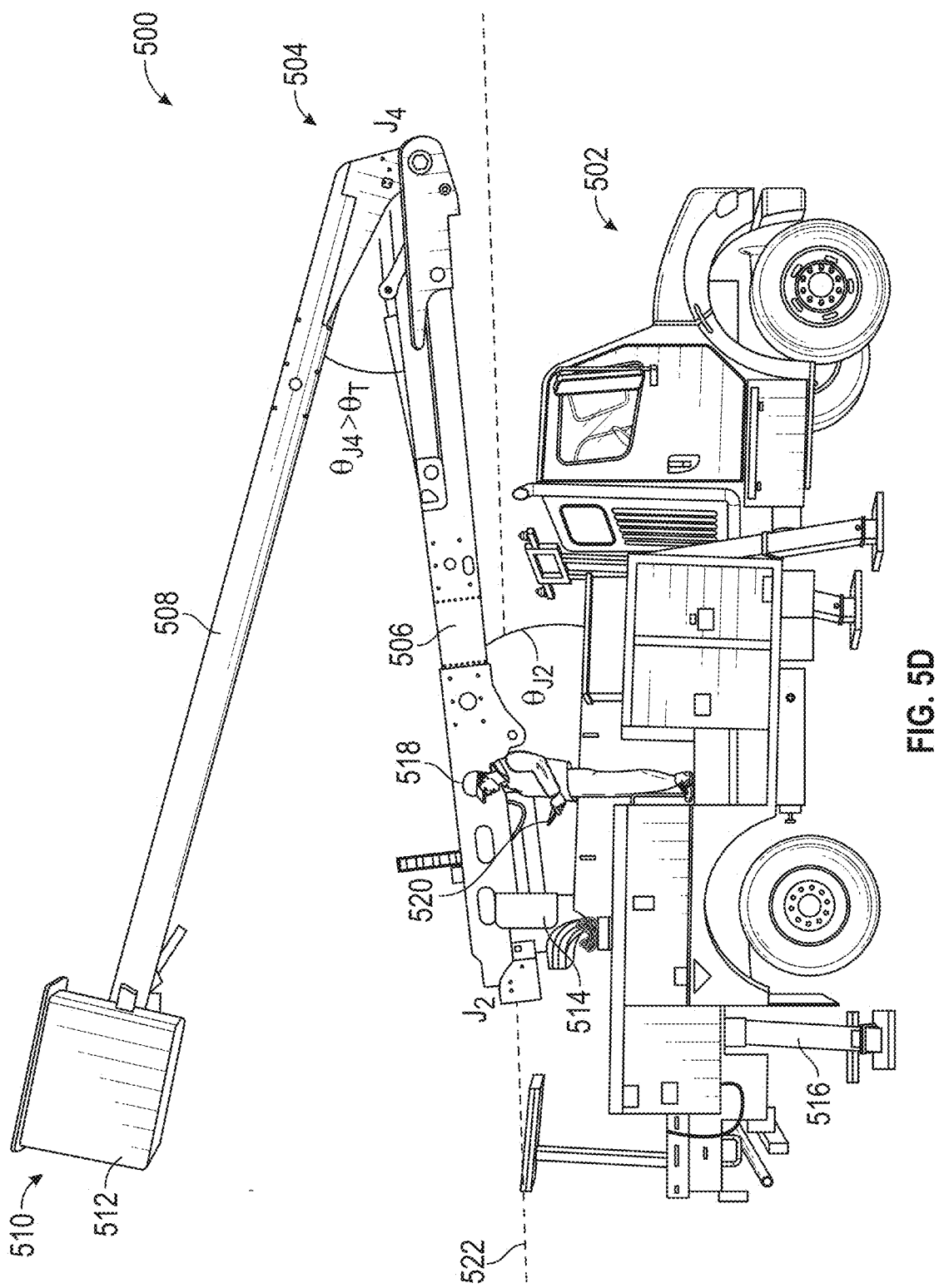

Looking now at FIGS. 5C and 5D, two intermediate positions of articulating boom assembly 504 when articulating boom assembly 504 transitions from the stowed position (FIG. 5A) to the ground position (FIG. 5B) are illustrated in accordance with embodiments of the present disclosure. Upon operator 518 actuating a corresponding input on input device 520, articulating boom assembly 504 may begin to move towards the desired end position, which in this case is the ground position shown in FIG. 5B.

As mentioned, for aerial device 500, the waypoints or checkpoints may be threshold or target angles of joints J1-J6 that articulating boom assembly 504 reaches to place boom tip 510 in the desired end position. In some embodiments, one of lower boom 506 or upper boom 508 must first reach a threshold angle before the other boom 506, 508 is allowed to move. The threshold angle may be an angle above which articulating boom assembly 504 is above the flight deck 522. For example, when moving out of the stowed position in FIG. 5A, upper boom 508 may move first such that J4 is at a threshold angle (e.g., 10 degrees). As shown in FIG. 5C, that angle has yet to be reached ($\theta_{J4} < \theta_T$), so movement of lower boom 506 is prevented. Once the threshold angle is reached as shown in FIG. 5D ($\theta_{J4} > \theta_T$), lower boom 506 may be allowed to move to the lower boom target angle (i.e., J2 target angle), and simultaneously, upper boom 508 may continue moving towards the upper boom target angle. In some embodiments, the target angle for the "locked" boom is not provided or computed until the "unlocked" boom reaches the target angle. Preventing movement of a boom 506, 508 until the other boom 506, 508 reaches a target angle may enable safe operations of the articulating boom assembly 504. For example, the target angles may be employed to ensure that the articulating boom assembly 504 is operated a safe height above the utility vehicle 502 to avoid collisions with the utility vehicle 502 and/or operator 518 that may be operating from a bed of the utility vehicle 502 or the like.

The determination of target joint angles may be based on the end position of the boom tip 510 and the pose of articulating boom assembly 504. As with boom assembly 204, articulating boom assembly 504 may comprise a plurality of sensors 122a for providing real-time or near-real time measurements of the position and orientation of each member of articulating boom assembly 504, along with sensors to determine the translational and/or rotational velocity, acceleration, jerk, or any combination thereof. In some embodiments, a flight deck 522 is defined (corresponding to flight deck 222), which may be a distance above utility vehicle 502 that the articulating boom assembly 504 is first raised before additional articulation of articulating boom assembly 504 is permitted to prevent collision with the utility vehicle 502 or operator 518.

In some embodiments, operator 518 can provide additional inputs to articulating boom assembly 504 while the automated motions are being carried out. For example, while operator 518 is actuating a control to move articulating boom assembly 504 to the stow position, the operator 518 may provide inputs to adjust one of lower boom 506, upper boom 508, or boom tip 510. For example, the operator 518 may adjust the position of upper boom 508 while moving to the stowed position. As previously discussed, input device 520 may be configured with momentary inputs such that operator 518 may have to press and hold a first button to cause articulating boom assembly 504 to move to the stow position and a second button to cause one of lower boom 506, upper boom 508, or boom tip 510 to also move.

When another input is received to move articulating boom assembly 504 while an automated operation is underway, control system 112 may continuously determine whether any target angles need to be recomputed based on the new pose of articulating boom assembly 504 and/or if a threshold angle has been violated. For example, if the movement of upper boom 508 moves the J4 angle back under a threshold angle, the automated motion of the boom assembly (may be stopped until the J4 angle is moved back above the threshold). Alternatively, or additionally, the automated motion of the boom may be reconfigured to move the boom assembly such that the J4 angle clears the threshold angle.

Figure 6:
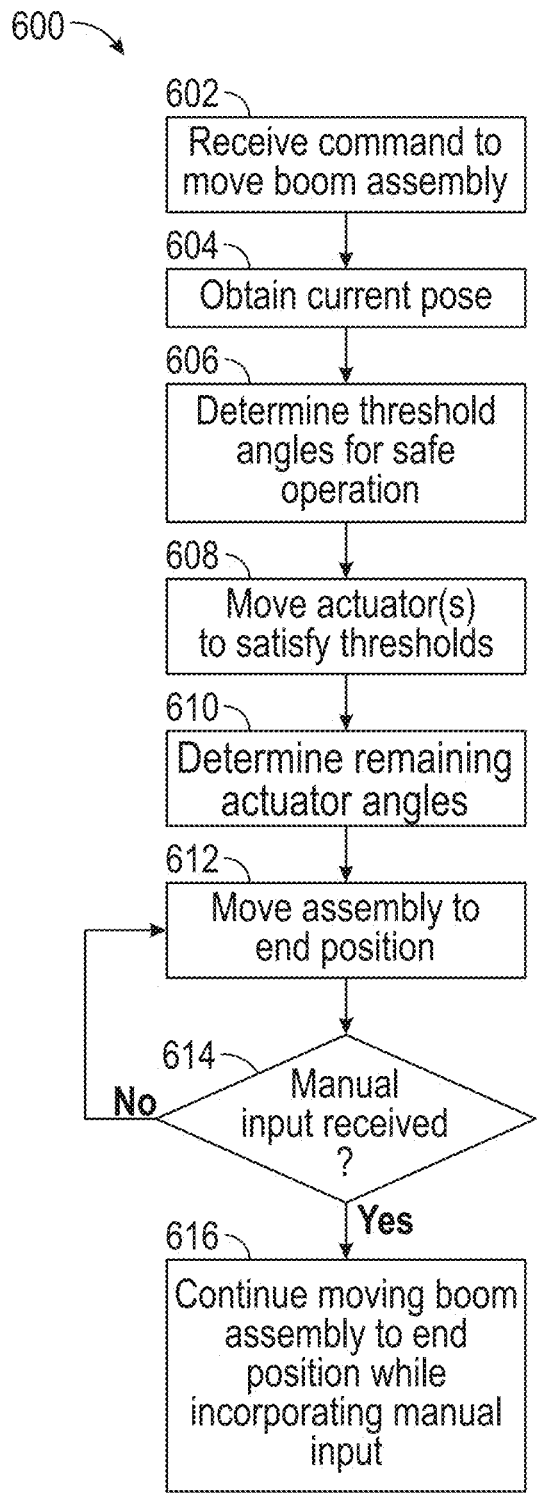
FIG. 6 illustrates an exemplary method for some embodiments.

Turning now to FIG. 6, a method 600 for automatically moving an articulating boom assembly 504 to an end position is illustrated for some embodiments. While described with respect to aerial device 500, method 600 may be carried out using aerial device 200. Method 600 may begin at step 602 where operator input to automatically move articulating boom assembly 504 to the stowed position is received. As previously discussed, this input may be received via an input device 520. Step 602 may be substantially similar to step 402 discussed above.

Subsequently, at step 604, the current pose (e.g., position and orientation) of the articulating boom assembly 504 may be received. The position information may include the current position of an articulator (e.g., lower boom 506 or upper boom 508), while the orientation information may include one or more of the angles of joints J1-J6.

Next, at step 606, the threshold angles for safe operation may be determined. In some embodiments, the threshold angles are any of the angles of joints J1-J6. In some embodiments, the threshold angles include at least one of the angle of J4 between lower boom 506 and upper boom 508, the angle of J2 between lower boom 506 and turntable 514, or the angle J1 of turntable 514. The threshold angles may in part be selected to place articulating boom assembly 504 above the flight deck 522.

Thereafter, at step 608, articulating boom assembly 504 be moved to satisfy the threshold angles. The movement of other components not involved in satisfying the threshold may be prevented while the threshold angle is met. For example, the threshold angle may be the angle of J4 to place articulating boom assembly 504 above the flight deck, and at step 608, only upper boom 508 is moved to raise the J4 angle to the threshold angle while lower boom 506 and turntable 514 are prevented from moving. In some embodiments, control system 112 prevents movement of lower boom 506 and/or turntable 514 by setting the target threshold angles associated therewith to the current angle.

Subsequently, at step 610, the remaining actuator angles may be determined. The remaining actuator angles may be the final actuator angles that will place the boom tip 510 at the desired end position. By providing these angles to the relevant components only after the threshold angles are reached, safe operation of the articulating boom assembly 504 may be ensured by only moving the other components after the articulating boom assembly 504 is safely above the flight deck 522 or otherwise in a position that has little to no collision risk.

Processing may then proceed to step 612, where articulating boom assembly 504 may be moved to the end position by moving each articulating boom assembly 504 to the end point joint angle. During the movement to the end position, it may be checked, at test 614, if a manual input is received. The manual input may be received from the operator 518, e.g., via a joystick or other input device. If no, processing may proceed back to step 612.

If yes at test 614, processing may proceed to step 616 where the articulating boom assembly 504 is continuously moved while incorporating the manual input into the movement of articulating boom assembly 504. As discussed above, incorporating the movement may involve monitoring the threshold angles to ensure the boom assembly is able to safely operate and by adjusting the movement of articulating boom assembly 504 if the threshold angles are violated.

When a manual input is received while the articulating boom assembly 504 is performing an automated motion, both the motion commanded by the manual input and the automated motion may be carried out simultaneously. Thus, for example, if the operator 518 provides a manual input commanding the boom tip 510 to swivel while the boom assembly 504 is performing an auto-to-ground automated motion, control system 112 may cause the boom tip 510 to swivel while still carrying out the auto-to-ground motion. However, in some embodiments, the manual input supersedes the automated motion. For example, where the manual input is to articulate the upper boom 508 during an auto-to-ground motion, the manual input may override the movement that the upper boom 506 would undertake during the auto-to-ground motion. Other motions of the boom assembly 504 during the auto-to-ground motion may still carry on. Thus, for example, motion of the lower boom 506 for the auto-to-ground motion would still be carried out while the operator 518 manually adjusts the upper boom 508.

Inputs for Automated Control of Articulating Boom Assembly

The operations of moving boom assembly 204, 504 via an input device (e.g., input devices 220, 520) are discussed in further detail hereinafter. In some embodiments, input devices 220, 520 are configured as pendant controls and may be hardwired to the utility truck (e.g., to computing system 112 disposed in the utility control). The input device may comprise a plurality of inputs, one or more of which may be configured as non-metering or momentary inputs that require the operator to continuously supply the input for the associated action to be carried about by the boom assembly. The use of non-metering buttons, as opposed to proportional joysticks that are typically used on pendant controls for boom assemblies, may improve the reliability of the system by easing the input method and may also be cheaper to manufacture and maintain. Additionally, the use of non-metering inputs, in combination with the boom assembly control system that may modulate the speed and acceleration of the boom assembly (discussed further below), may improve the operator experience as the operator is not required to change the input provided to the input device in order for a change in the speed and/or acceleration of the articulating boom assembly 504 to be realized. As discussed above, this may prove especially advantageous in situations where an operator is operating the boom assembly single-handedly, such as in an emergency situation where the operator uses one hand to operate the input device and their other hand for another task, such as communication with emergency personnel over the phone.

As discussed above with respect to FIG. 1, the systems, methods, and computer-readable media described further below are configured to interpret operator input via the input device differently based in part on at least the pose of the boom assembly when the input is received and/or based on a state of the boom assembly when the input is received. For example, if it is determined that an input is to move boom assembly 204 from a stopped position, the operator may be given more control over the movements, e.g., the velocity command for the hydraulic valves may be reduced (e.g., may be 25% slower than a typical/baseline velocity command). As another example, if the same input (e.g., the same press duration) is received when an actuator (e.g., a boom section) is near a known articulation limit, the output may be slowed to prevent overextending the articulator, which may cause damage to the boom assembly. It should be noted that giving the operator more control and limiting the output (e.g., velocity) of the actuator may both happen with the same input provided by the operator (e.g., the same press duration of an input element, such as a button).

An exemplary input device 700 is illustrated with respect to FIG. 7. Exemplary input device 700 may correspond to any of the input devices described herein, e.g., input device 220, input device 248, input device 520, and/or input device 110, or any combination thereof. As shown, input device 700 may comprise a plurality of inputs actuatable by an operator 218, 518 to cause boom assembly 204, 504 to carry out a corresponding action. One or more of the inputs may be non-metering or momentary inputs.

In some embodiments, an aerial device includes upper controls located at the aerial platform via which an operator in the aerial platform can control the movement of the boom assembly and lower controls located proximate a base of the boom assembly via which an operator can control the movement of the boom assembly. The upper controls and the lower controls may or may not be the same device. In some embodiments, the lower controls include a keypad input device, such as input device 700, while the upper controls include joystick inputs. In some embodiments, only one of the upper controls or the lower controls is active at one time. Accordingly, a station selection input 702 may be provided to control whether the control system 112 should process inputs from the upper controls or the lower controls. Thus, an operator using input device 700 at the utility vehicle 202, 502 may allow another operator that is in the aerial platform 212, 512 to control the boom assembly 204, 504 via an input device 700 located at the truck.

Input device 700 may also include an auto ground input 704a and an auto stow input 704b. These inputs 704a, 704b may be actuated by an operator to cause the boom assembly 204, 504 to move to the selected position (i.e., ground or stow) as discussed above. Other inputs for moving the boom assembly to a desired end position may likewise be provided on 700. For example, a pre-flight routine input 704c may be provided that, when actuated by the operator, may cause the boom assembly to undergo a pre-programmed preflight routine. Additionally, a last position input 704d may be provided. The last position input 704d, when actuated, may return the boom assembly to a last working position as discussed previously.

A plurality of boom assembly inputs 706 may also be included enabling the operator to operate an actuator of the boom assembly. For example, inputs 706 may be provided for changing any of the angles of the joints J1-J6.

Additionally, input device 700 may include indicators 708, which may be LEDs in some embodiments. Indicators 708 may be turned on when the corresponding input is received. In some embodiments, the number of indicators 708 actuated for an input corresponds to a speed of the corresponding actuation. For example, two of the three displayed indicators may be on when the boom assembly is operating at a medium speed level.

As previously discussed, at least one of the inputs 702 may be a non-metering input. In some embodiments, a preset velocity (which may be configurable by the operator) is commanded if a momentary, non-metering input is pressed. Once the input is released, the velocity command may cease. In some embodiments, control system 112 may interpret the non-metering button presses of inputs 704a, 704b, 704c, 704d, 706 as velocity commands for controlling a respective hydraulic valve, e.g., to move the respective articulator at the preset velocity.

As with the automated movements of boom assembly 204, 504 discussed above, estimating the desired position or velocity based on a button press of an input 702 may be based in part on the pose and/or the state of the boom assembly 204, 504 when the input is received. Thus, for example, if the current pose of upper boom 208 is near an actuation limit thereof, the input position or velocity estimate may be damped to prevent overextending the boom. More specifically, by knowing the machine geometry and actuator limits and monitoring the position of the components of boom assembly 204, the actuation of the hydraulic valves powering the actuators can be restricted to ensure the operator does not actuate the actuators past the respective limits. In contrast, if the upper boom is not near the actuation limit thereof, the input position or velocity estimate may be increased such that the operator can place the boom assembly in the desired end position faster. As the boom assembly reaches the desired position, the speed may then be damped. Again, it should be noted that the changes to the velocity and/or acceleration of the boom assembly may be done by the control system while the operator maintains the same input via input device 700.

Figure 8:
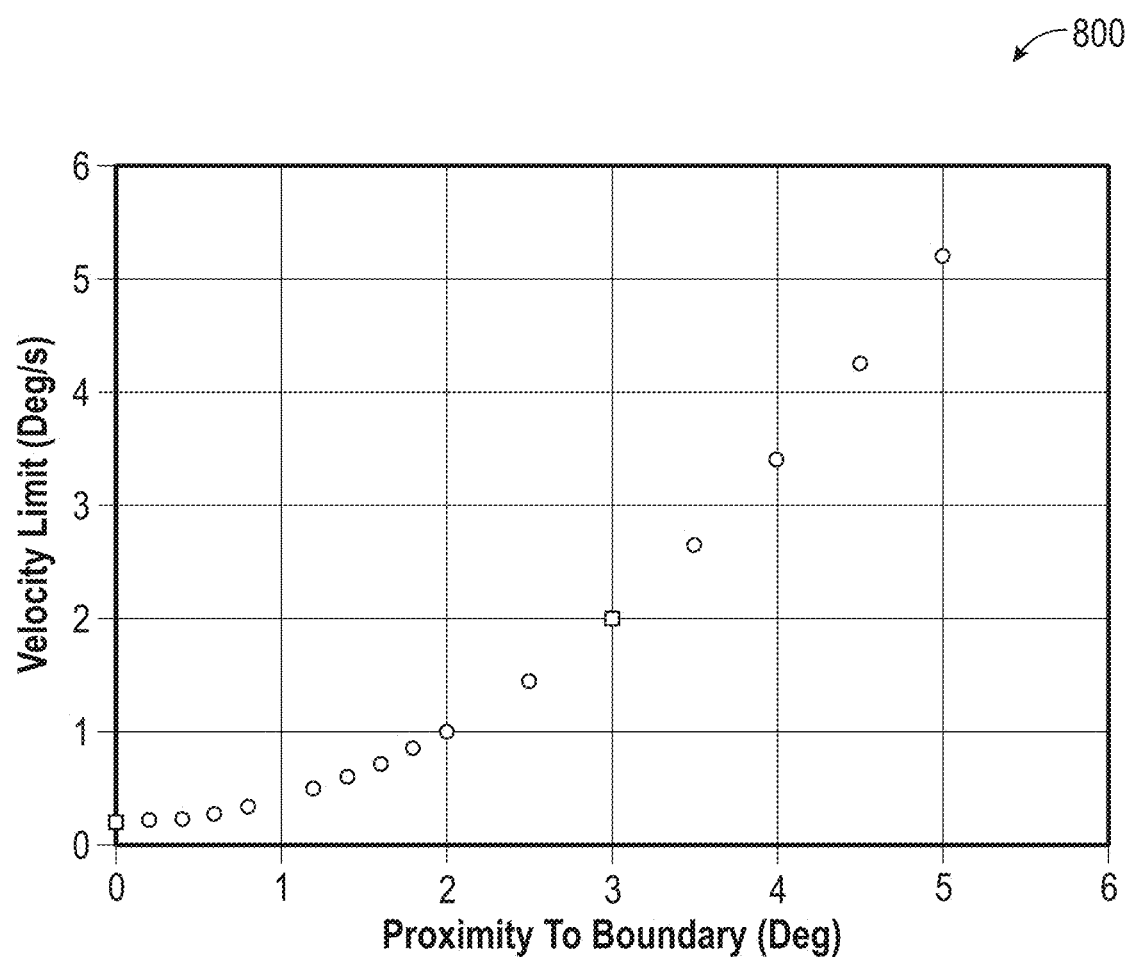
FIG. 8 depicts an exemplary motion profile for moving an articulator of an aerial device as the articulator approaches a boundary for some embodiments.

Turning now to FIG. 8, an exemplary motion profile 800 is depicted in accordance with aspects of the present disclosure. The y-axis of the graph depicts the angular velocity of an actuator (e.g., an upper boom, a lower boom, a turntable, etc.) in degrees/sec, and the x-axis depicts the proximity of the actuator to a boundary in degrees. In some embodiments, the motion of a boom assembly may be controlled based on boundaries (e.g., mechanical limits of the boom assembly or physical boundaries such as objects in the environment or the utility truck) to avoid collisions. Some non-limiting examples of boundaries include: mechanical limits of the boom assembly, such as actuator limits; objects in the environment, such as a utility pole or a tree; the boom assembly and/or aerial device itself, e.g., to prevent the collisions of the upper boom with the utility truck; and the ground. In some embodiments, control system controls the operation of valves 120 as an articulator 102 nears a boundary.

As shown, motion profile 800 employs a quadratic slow-down to the velocity of an actuator as the actuator nears a boundary, i.e., as the actuator approaches 0 degrees from the boundary. Exemplary motion profile 800 is one example of how the operation of boom assembly 104 may be adjusted without the operator 108 having to adjust the input provided via input device 110. Thus, a more operator friendly system is provided because the operator does not have to make precise inputs to ensure that collisions are avoided. Rather, the operator may simply hold the input without concern that a collision may occur. Such operation may be especially useful where, for example, the operator is approaching a workplace (e.g., a utility pole) while operation input device 110 in an aerial platform. Sensors on the boom assembly, such as sensors 122a, 122b discussed above, may detect the presence of the utility pole as the operator approaches the pole, exemplary motion profile 800 may be executed to slow down the platform as the platform nears the pole without requiring the operator to make any change to the input provided via input device 110. While motion profile 800 is based on angular position and velocity, a motion profile may similarly be implemented for translational positions, velocities, accelerations, or any combination thereof. Additionally, the motion profile 800 may be input agnostic, such that the motion profile 800 may be implemented with any input, including the button inputs described above, along with joystick inputs or the like.

Computing Platform

Figure 9:
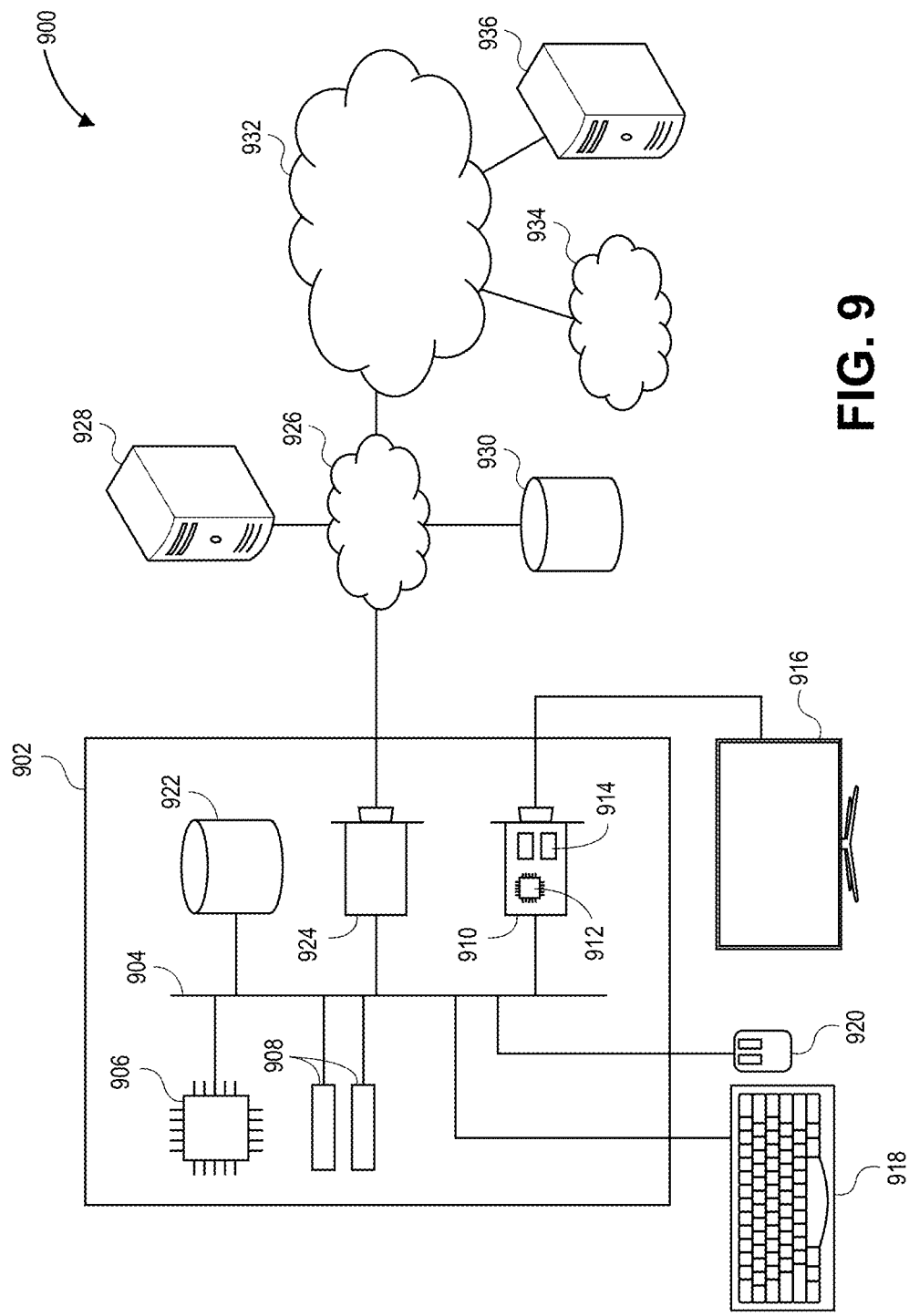
FIG. 9 illustrates an exemplary hardware platform for some embodiments.

Turning now to FIG. 9, an exemplary hardware platform of computing system 900 for certain embodiments of the invention is depicted. Computing system 900 may correspond to control system 112 in some embodiments. Computer 902 can be a desktop computer, a laptop computer, a server computer, a recording device manager, a mobile device such as a smartphone or tablet, or any other form factor of general- or special-purpose computing device. Depicted with computer 902 are several components, for illustrative purposes. In some embodiments, certain components may be arranged differently or absent. Additional components may also be present. Included in computer 902 is system bus 904, whereby other components of computer 902 can communicate with each other. In certain embodiments, there may be multiple busses or components may communicate with each other directly. Connected to system bus 904 is central processing unit (CPU) 906. Also attached to system bus 904 are one or more random-access memory (RAM) modules 908. Also attached to system bus 904 is graphics card 910. In some embodiments, graphics card 910 may not be a physically separate card, but rather may be integrated into the motherboard or the CPU 906. In some embodiments, graphics card 910 has a separate graphics-processing unit (GPU) 912, which can be used for graphics processing or for general purpose computing (GPGPU).

Also on graphics card 910 is GPU memory 914. Connected (directly or indirectly) to graphics card 910 is display 916 for user interaction. In some embodiments no display is present, while in others it is integrated into computer 902. Similarly, peripherals such as keyboard 918 and mouse 920 are connected to system bus 904. Additionally, any number of sensors (not shown) such as the biometric sensor discussed above may also be connected to system bus 904. Like display 916, these peripherals may be integrated into computer 902 or absent. Also, connected to system bus 904 is local storage 922, which may be any form of computer-readable media, and may be internally installed in computer 902 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Network interface card (NIC) 924 is also attached to system bus 904 and allows computer 902 to communicate over a network such as network 926. NIC 924 can be any form of network interface known in the art, such as Ethernet, ATM, fiber, Bluetooth, or Wi-Fi (i.e., the IEEE 702.11 family of standards). NIC 924 connects computer 902 to local network 926, which may also include one or more other computers, such as computer 928, and network storage, such as data store 930. Generally, a data store such as data store 930 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 928, accessible on a local network such as local network 926, or remotely accessible over Internet 932. Local network 926 is in turn connected to Internet 932, which connects many networks such as local network 926, remote network 934 or directly attached computers such as computer 936. In certain embodiments, computer 902 can itself be directly connected to Internet 932.

Features described above as well as those claimed below may be combined in various ways without departing from the scope hereof. The following examples illustrate some possible, non-limiting combinations:

Clause 1. A method for automatically moving an articulating boom assembly, the articulating boom assembly comprising an upper boom coupled to a lower boom at a first end and coupled to a boom tip at a second end, comprising: receiving, via a computing device associated with the articulating boom assembly, user input indicative of an end position for the boom tip; determining, based on the user input, a first coordinate location of the end position; generating a flight path from a second coordinate location of a starting position of the boom tip to the end position, wherein the flight path comprises a plurality of coordinate waypoints between the first coordinate location and the second coordinate location; automatically moving the articulating boom assembly to move the boom tip through each of the plurality of coordinate waypoints to the end position; and responsive to reaching one of the end position or a predefined distance to the end position, stopping motion of the articulating boom assembly.

Clause 2. The method of clause 1, further comprising: while moving the articulating boom assembly to the end position, detecting an object in a path of the boom tip; responsive to detecting the object, generating a new coordinate waypoint; and moving the boom tip through the new coordinate waypoint to avoid the object.

Clause 3. The method of clause 1 or clause 2, wherein at least one of the articulating boom assembly or a device associated with the articulating boom assembly comprises at least one sensor configured to detect the object.

Clause 4. The method of any of clauses 1-3, wherein the at least one sensor is selected from a group consisting of: an infrared sensor, a video camera, a three dimensional depth camera, an ultrasonic sensor, a laser sensor, a radar sensor, a touch sensor, an electrical voltage detector, and a proximity sensor.

Clause 5. The method of any of clauses 1-4, further comprising: receiving video data captured by a video capture device associated with the articulating boom assembly; and displaying the video data on the computing device associated with the articulating boom assembly, wherein the user input is received via a display of the computing device.

Clause 6. The method of any of clauses 1-5, wherein the user input is a first user input and the method further comprises: receiving a second user input indicative of a desired speed or a desired acceleration of the articulating boom assembly, wherein automatically moving the articulating boom assembly comprises moving the articulating boom assembly in accordance with the second user input.

Clause 7. The method of any of clauses 1-6, wherein the end position is one of a ground position, a stow position, a last working position, or a user-defined end position.

Clause 8. A system for automatically moving a boom assembly, comprising: a boom assembly base supporting the boom assembly, the boom assembly comprising at least one boom section; at least one boom component, wherein the at least one boom component comprises at least one of a boom tip, a jib tip, or a joint of the boom assembly; at least one processor; and one or more non-transitory computer-readable media storing computer-executable instructions that, when executed by the at least one processor, cause the system to carry out actions, comprising: receiving user input indicative of an end position of the at least one boom component; generating a flight path from a start position of the at least one boom component to the end position; wherein the flight path comprises a plurality of waypoints between the start position and the end position, and automatically moving the boom assembly through the flight path; and when the at least one boom component reaches the end position, stopping movement of the boom assembly.

Clause 9. The system of clause 8, further comprising: an input device located proximate the boom assembly base and comprising a first input for commanding a first predefined end position and a second input for commanding a second predefined end position, wherein the first predefined end position is a ground position of the boom assembly and the second predefined end position is a stowed position of the boom assembly.

Clause 10. The system of clause 8 or clause 9, wherein at least one of the first input or the second input is a momentary input.

Clause 11. The system of any of clauses 8-10, wherein the actions further comprise: receiving an additional input to move the at least one boom section via a third input while continually receiving the first input or the second input to move the at least one boom component; and responsive to receiving the additional input, moving the at least one boom section based on the additional input, wherein motion of the at least one boom component, based on the first input or the second input, that relies on movement of the at least one boom section is superseded while the additional input is received.

Clause 12. The system of any of clauses 8-111, wherein the at least one boom section comprises an upper boom section coupled to a lower boom section and wherein the actions further comprise: moving the upper boom section above a threshold angle formed between the upper boom section and the lower boom section before moving the lower boom section.

Clause 13. The system of any of clauses 8-12, wherein a target joint angle associated with the end position is provided for the lower boom section after the upper boom section reaches the threshold angle.

Clause 14. The system of any of clauses 8-13, wherein a path between each of the plurality or waypoints is a straight line.

Clause 15. The system of any of clauses 8-14, wherein the actions further comprise: decreasing a velocity of an articulator of the boom assembly in accordance with a stored motion profile as the articulator approaches the end position.

Clause 16. One or more non-transitory computer-readable media storing computer-executable instructions that, when executed by at least one processor, perform a method of automatically moving a boom assembly, comprising: receiving user input indicative of an end position for a boom tip of the boom assembly, wherein the boom assembly comprises a lower boom coupled to an upper boom at a first end of the upper boom, and wherein the boom tip is coupled to a second end of the upper boom; responsive to receiving the user input, determining a flight path for the boom tip from a start position of the boom tip to the end position, wherein the flight path comprises a plurality of waypoints between the start position and the end position; automatically moving the boom assembly to thereby move the boom tip through each of the plurality of waypoints and to the end position; and when the boom tip reaches the end position, stopping further movement of the boom assembly.

Clause 17. The media of clause 16, wherein the end position is one of: a stowed position of the boom assembly, a ground position of the boom assembly, or a user-defined position.

Clause 18. The media of clause 16 or clause 17, wherein the boom assembly is configured to move the boom tip between from successive waypoints in at least one of: a straight line, a first path that minimizes total travel time, or a second path that minimizes energy consumption.

Clause 19. The media of any of clauses 16-19, further comprising: prior to automatically moving the boom assembly, raising the boom assembly above a flight deck associated with the boom assembly that is relative to a ground surface or to an origin position of the boom assembly.

Clause 20. The media of clauses 16-19, further comprising: based on at least one of: a detection of an object or the start position of the boom tip, disallowing the user input to initiate the automatic movement of the boom assembly.

Clause 21. The media of 16-20, wherein the plurality of waypoints is determined in real time based on a pose of the boom assembly.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

1. A method for automatically moving an articulating boom assembly, the articulating boom assembly comprising an upper boom coupled to a lower boom at a first end and coupled to a boom tip at a second end, comprising:
   receiving, via an input device located proximate a base of the articulating boom assembly, user input indicative of an end position for the boom tip,
   wherein the input device comprises a first input for commanding a first predefined end position and a second input for commanding a second predefined end position,
   wherein the first predefined end position is a ground position of the articulating boom assembly and the second predefined end position is a stowed position of the articulating boom assembly,
   wherein at least one of the first input or the second input is a momentary input, and
   wherein the end position is one of the first predefined end position or the second predefined end position;
   determining, based on the user input, a first coordinate location of the end position;
   generating a flight path from a second coordinate location of a starting position of the boom tip to the end position, wherein the flight path comprises a plurality of coordinate waypoints between the first coordinate location and the second coordinate location;
   automatically moving the articulating boom assembly to move the boom tip through each of the plurality of coordinate waypoints to the end position; and
   responsive to reaching one of the end position or a predefined distance to the end position, stopping motion of the articulating boom assembly.

2. The method of claim 1, further comprising:
   while moving the articulating boom assembly to the end position, detecting an object in a path of the boom tip;
   responsive to detecting the object, generating a new coordinate waypoint; and
   moving the boom tip through the new coordinate waypoint to avoid the object.

3. The method of claim 2,
   wherein at least one of the articulating boom assembly or a device associated with the articulating boom assembly comprises at least one sensor configured to detect the object.

4. The method of claim 3, wherein the at least one sensor is selected from a group consisting of: an infrared sensor, a video camera, a three dimensional depth camera, an ultrasonic sensor, a laser sensor, a radar sensor, a touch sensor, an electrical voltage detector, and a proximity sensor.

5. The method of claim 1, further comprising:
   receiving video data captured by a video camera associated with the articulating boom assembly; and
   displaying the video data on a display associated with the articulating boom assembly,
   wherein the user input is received via the display.

6. The method of claim 1, wherein the user input is a first user input and the method further comprises:
   receiving a second user input indicative of a desired speed or a desired acceleration of the articulating boom assembly,
   wherein automatically moving the articulating boom assembly comprises moving the articulating boom assembly in accordance with the second user input.

7. The method of claim 1, wherein the input device further comprises a third input for commanding a last working position or a user-defined end position.

8. A system for automatically moving a boom assembly, comprising:
   a boom assembly base supporting the boom assembly, the boom assembly comprising at least one boom section;
   at least one boom component,
   wherein the at least one boom component comprises at least one of a boom tip, a jib tip, or a joint of the boom assembly;
   at least one processor; and
   one or more non-transitory computer-readable media storing computer-executable instructions that, when executed by the at least one processor, cause the system to carry out actions, comprising:
      receiving, via an input device located proximate the boom assembly base, user input indicative of an end position of the at least one boom component,
      wherein the input device comprises a first input for commanding a first predefined end position and a second input for commanding a second predefined end position,
      wherein the first predefined end position is a ground position of the boom assembly and the second predefined end position is a stowed position of the boom assembly,
      wherein at least one of the first input or the second input is a momentary input, and
      wherein the end position is one of the first predefined end position or the second predefined end position;
      generating a flight path from a start position of the at least one boom component to the end position,
      wherein the flight path comprises a plurality of waypoints between the start position and the end position;
      automatically moving the boom assembly through the flight path; and
      when the at least one boom component reaches the end position, stopping movement of the boom assembly.

9. The system of claim 8, wherein the actions further comprise:
   receiving an additional input to move the at least one boom section via a third input while continually receiving the first input or the second input to move the at least one boom component; and
   responsive to receiving the additional input, moving the at least one boom section based on the additional input,
   wherein motion of the at least one boom component, based on the first input or the second input, that relies on movement of the at least one boom section is superseded while the additional input is received.

10. The system of claim 8, wherein the at least one boom section comprises an upper boom section coupled to a lower boom section and wherein the actions further comprise:

moving the upper boom section above a threshold angle formed between the upper boom section and the lower boom section before moving the lower boom section.

11. The system of claim 10, wherein a target joint angle associated with the end position is provided for the lower boom section after the upper boom section reaches the threshold angle.

12. The system of claim 8, wherein a path between each of the plurality of waypoints is a straight line.

13. The system of claim 8, wherein the actions further comprise:

decreasing a velocity of an articulator of the boom assembly in accordance with a stored motion profile as the articulator approaches the end position.

14. The system of claim 13, wherein the stored motion profile is based on angular positions or translational positions.

15. The system of claim 13, wherein the stored motion profile is input agnostic.

16. One or more non-transitory computer-readable media storing computer-executable instructions that, when executed by at least one processor, perform a method of automatically moving a boom assembly, comprising:

receiving, via an input device located proximate a base of the boom assembly, user input indicative of an end position for a boom tip of the boom assembly, wherein the input device comprises a first input for commanding a first predefined end position and a second input for commanding a second predefined end position, wherein the first predefined end position is a ground position of the boom assembly and the second predefined end position is a stowed position of the boom assembly, wherein at least one of the first input or the second input is a momentary input, and wherein the end position is one of the first predefined end position or the second predefined end position, wherein the boom assembly comprises a lower boom coupled to an upper boom at a first end of the upper boom, wherein the boom tip is coupled to a second end of the upper boom;

responsive to receiving the user input, determining a flight path for the boom tip from a start position of the boom tip to the end position, wherein the flight path comprises a plurality of waypoints between the start position and the end position;

automatically moving the boom assembly to thereby move the boom tip through each of the plurality of waypoints and to the end position; and when the boom tip reaches the end position, stopping further movement of the boom assembly.

17. The media of claim 16, wherein the boom assembly is configured to move the boom tip between from successive waypoints in at least one of: a straight line, a first path that minimizes total travel time, or a second path that minimizes energy consumption.

18. The media of claim 16, further comprising:

prior to automatically moving the boom assembly, raising the boom assembly above a flight deck associated with the boom assembly that is relative to a ground surface or to an origin position of the boom assembly.

19. The media of claim 16, further comprising:

based on at least one of: a detection of an object or the start position of the boom tip, disallowing the user input to initiate the automatic movement of the boom assembly.

20. The media of claim 16, wherein the plurality of waypoints is determined in real time based on a pose of the boom assembly.

21. The media of claim 16, wherein the method of automatically moving the boom assembly further comprises:

storing a last working position of the boom assembly, wherein the last working position corresponds with a final position of operation of the boom assembly at one of the plurality of waypoints or the end position of the flight path; and prior to a subsequent automatic movement of the boom assembly during a subsequent operation, returning the boom assembly to the last working position.

\* \* \* \* \*